US012288495B2

(12) United States Patent
Ryu et al.

(10) Patent No.: US 12,288,495 B2
(45) Date of Patent: Apr. 29, 2025

(54) DISPLAY DEVICE AND DRIVING METHOD THEREOF

(71) Applicant: SAMSUNG ELECTRONICS CO., LTD., Suwon-si (KR)

(72) Inventors: Seong-Young Ryu, Suwon-si (KR); Sunkwon Kim, Suwon-si (KR); Wangsuk Sung, Suwon-si (KR); Uijong Song, Suwon-si (KR); Yilho Lee, Suwon-si (KR); Heejin Lee, Suwon-si (KR); Hyunwook Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1 day.

(21) Appl. No.: 18/238,885

(22) Filed: Aug. 28, 2023

(65) Prior Publication Data

US 2024/0296769 A1 Sep. 5, 2024

(30) Foreign Application Priority Data

Mar. 2, 2023 (KR) ........................ 10-2023-0027703

(51) Int. Cl.
*G09G 3/20* (2006.01)

(52) U.S. Cl.
CPC ....... *G09G 3/20* (2013.01); *G09G 2310/0267* (2013.01); *G09G 2310/0275* (2013.01); *G09G 2310/0291* (2013.01); *G09G 2310/08* (2013.01)

(58) Field of Classification Search
None
See application file for complete search history.

(56) References Cited

U.S. PATENT DOCUMENTS

| | | | |
|---|---|---|---|
| 10,248,198 B1 | 4/2019 | Kim | |
| 10,410,313 B2 | 9/2019 | Saleh et al. | |
| 10,475,370 B2 | 11/2019 | Spitzer et al. | |
| 10,504,442 B2 | 12/2019 | Yoo | |
| 10,565,964 B2 | 2/2020 | Hicks et al. | |
| 10,627,899 B2 | 4/2020 | Price et al. | |
| 11,164,352 B2 | 11/2021 | Surti et al. | |
| 11,430,391 B2 | 8/2022 | Kwak et al. | |
| 11,487,357 B2 | 11/2022 | Choi et al. | |
| 2003/0058229 A1 * | 3/2003 | Kawabe ................. | G09G 5/006 345/204 |
| 2022/0076467 A1 | 3/2022 | Surti et al. | |

* cited by examiner

*Primary Examiner* — Nicholas J Lee
(74) *Attorney, Agent, or Firm* — Sughrue Mion, PLLC

(57) ABSTRACT

A display device is provided. The display device includes: a pixel array including pixels connected to gate lines and source lines; and a driving circuit configured to: apply gate signals to the gate lines and provide data signals to the source lines during a first scan period such that horizontal periods of the gate signals do not overlap each other, and apply the gate signals to first gate lines, of the gate lines, connected to pixels in a first area of the pixel array in a different manner from second gate lines, of the gate lines, connected to pixels in a second area of the pixel array for a portion of a second scan period, provide the data signals to the source lines, and maintain a low-biased state or an off state for a remaining portion of the second scan period.

20 Claims, 17 Drawing Sheets

DISPLAY DEVICE AND DRIVING METHOD THEREOF

CROSS-REFERENCE TO RELATED APPLICATION

This application claims priority Korean Patent Application No. 10-2023-0027703, filed in the Korean Intellectual Property Office on Mar. 2, 2023, the disclosure of which is incorporated by reference herein in its entirety.

BACKGROUND

Field

The disclosure relates to a display device and a driving method thereof.

Description of Related Art

A near to eye (NTE) display device may be used to provide virtual reality (VR) and augmented reality (AR). The NTE display device may be mounted on a wearable device and provide the user with a magnified image through the optical system. In this regard, the NTE display device may have a microdisplay that can display high-resolution images in a small size and without visible pixels.

The video encoding system of a wearable device may perform an image rendering operation on the image data to reduce the resolution in peripheral areas while maintaining a higher resolution in foveated areas. The micro display displays an image of the peripheral area and an image of the foveated area using the same driving method.

SUMMARY

One or more example embodiments provide a display device and a method of driving the same, which can display images of a peripheral area and images of a foveated area in different ways.

One or more example embodiments also provide a display device and a method of driving the same for displaying an image such that a difference in display quality between an image in a peripheral area and an image in a foveated area is not visible to a user.

According to an aspect of an example embodiment, a display device, includes: a pixel array including a plurality of pixels connected to a plurality of gate lines and a plurality of source lines; and a driving circuit configured to: apply a plurality of gate signals to the plurality of gate lines and provide a plurality of data signals to the plurality of source lines during a first scan period such that horizontal periods of the plurality of gate signals do not overlap each other, and apply the plurality of gate signals to first gate lines, of the plurality of gate lines, connected to pixels in a first area of the pixel array in a different manner from second gate lines, of the plurality of gate lines, connected to pixels in a second area of the pixel array for a portion of a second scan period, provide the plurality of data signals to the plurality of source lines, and maintain a low-biased state or an off state for a remaining portion of the second scan period.

According to an aspect of an example embodiment, a display system, includes: a host device configured to provide image data indicating an image including a first area rendered with a first quality and a second area rendered with a second quality lower than the first quality; and a display device including: a pixel array including a plurality of pixels and configured to receive a plurality of data signals corresponding to the image data during a scan period and emit light corresponding to the plurality of data signals during an emission period following the scan period; and a driving circuit configured to receive the image data and maintain a low-biased state or an off state for a portion of the scan period, wherein the portion of the scan period is determined based on a time of providing the plurality of data signals to pixels corresponding to the second area of the plurality of pixels.

According to an aspect of an example embodiment, a method of driving a display device includes: applying non-overlapping gate signals to first gate lines connected to first pixels in a first area; applying data signals corresponding to the first pixels to source lines connected to the first pixels; applying overlapping gate signals to second gate lines connected to second pixels in a second area different from the first area; applying data signals corresponding to the second pixels to source lines connected to the second pixels; and entering a low-biased state or an off state.

BRIEF DESCRIPTION OF DRAWINGS

The above and other aspects and features will be more apparent from the following description of embodiments with reference to the attached drawings, in which.

DETAILED DESCRIPTION

Figure 1:
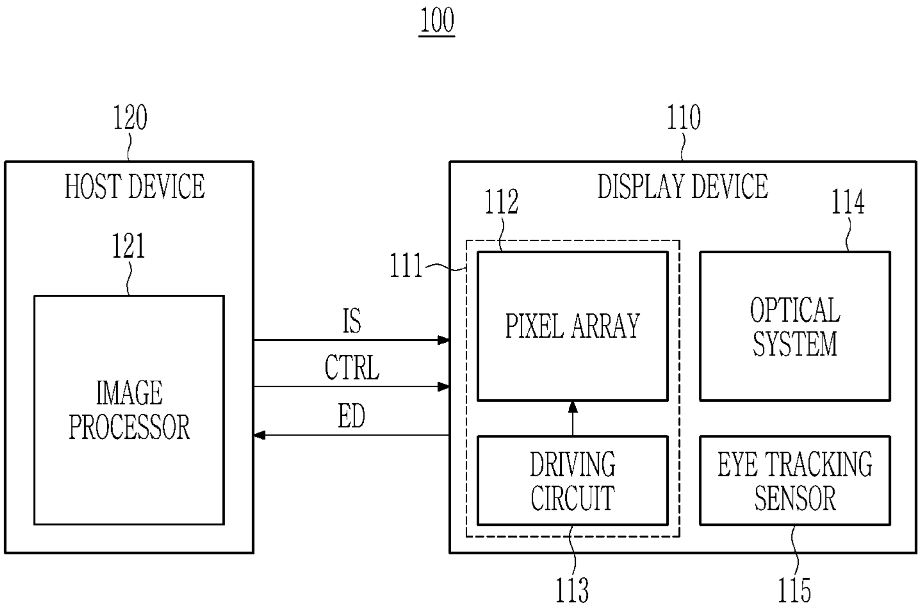
FIG. 1 is an exemplary block diagram of a display system according to an embodiment.

Example embodiments will be described more fully hereinafter with reference to the accompanying drawings. Each embodiment provided in the following description is not excluded from being associated with one or more features of another example or another embodiment also provided herein or not provided herein but consistent with the present disclosure. In the following detailed description, only certain example embodiments have been shown and described, simply by way of illustration. As those skilled in the art would realize, the described embodiments may be modified in various different ways without departing from the spirit or scope of the present invention. The present disclosure may be embodied in many different forms and is not limited to the embodiments described herein.

Accordingly, the drawings and description are to be regarded as illustrative in nature and not restrictive. Like reference numerals designate like elements throughout the specification. And in order to clearly explain the present invention in the drawings, parts irrelevant to the description are omitted, and similar reference numerals are attached to similar parts throughout the specification. In the flowchart described with reference to the drawings, the order of operations may be changed, several operations may be merged, a certain operation may be divided, and a specific operation may not be performed.

In addition, expressions described in the singular may be interpreted in the singular or plural unless explicit expressions such as "one" or "single" are used. Terms including ordinal numbers, such as first and second, may be used to describe various components, but the components are not limited by these terms. These terms may be used for the purpose of distinguishing one component from another. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

FIG. 1 is an exemplary block diagram of a display system according to an embodiment.

The display system 100 may provide an artificial reality system, such as a VR system, an AR system, a mixed reality (MR) system, a hybrid reality system, or some combination and/or derivative thereof. Artificial reality systems may be implemented on a variety of platforms, including head mounted displays (HMDs), mobile devices, computing systems, or other hardware platforms that can present artificial reality content to one or more viewers. The display system 100 may include a display device 110 and a host device 120.

The display device 110 may receive image data IS transmitted from the host device 120 and display an image according to the image data IS. The display device 110 may display a 2D or 3D image to a user. The display device 110 may include a display panel 111, an optical system 114, and an eye tracking sensor 115. In some embodiments, the display device 110 may further include a power supply circuit such as a DC/DC converter providing a driving voltage to the display panel 111, the optical system 114, and the eye tracking sensor 115.

In some embodiments, the display panel 111 may display an image to the user according to image data IS received from the host device 120. In various embodiments, the display panel 111 may be one or a plurality of display panels. For example, two display panels 111 may provide images for each eye of the user. The display panel 111 may include a liquid crystal display (LCD), an organic light emitting diode (OLED) display, an inorganic light emitting diode (ILED) display, a micro light emitting diode (μLED) display, an active matrix OLED display (AMOLED), and a transparent OLED display (TOLED: transparent OLED) and the like.

In some embodiments, the display panel 111 may include a pixel array 112 and a driving circuit 113. The display panel 111 may have a backplane structure in which the pixel array 112 and the driving circuit 113 are disposed on a silicon substrate (e.g., a silicon semiconductor substrate). For example, the display panel 111 may include a pixel array 112 and a driving circuit 113 on a complementary metal-oxide-semiconductor (CMOS) wafer.

The pixel array 112 may include a plurality of pixels, and a plurality of gate lines and a plurality of source lines respectively connected to the plurality of pixels. In some embodiments, the plurality of pixels may emit light of a dominant color such as red, green, blue, white, or yellow.

The driving circuit 113 may generate a signal for driving the pixel array 112 based on the image data IS received from the host device 120. Signals for driving the pixel array 112 may be transmitted to a plurality of pixels through a plurality of gate lines and a plurality of source lines. In some embodiments, the driving circuit 113 may generate gate signals and data signals to drive the plurality of pixels included in the pixel array 112, and may provide the gate signals and data signals to the plurality of pixels. The plurality of pixels included in the pixel array 112 may emit image light according to a signal provided by the driving circuit 113.

An image displayed on the display panel 111 may be viewed by the user's eyes through the optical system 114. In some embodiments, the optical system 114 may optically display image content or magnify image light received from the display panel 111, correct optical errors associated with the image light, and provide the corrected image light to a user. For example, the optical system 114 may include substrates, optical waveguides, apertures, Fresnel lenses, convex lenses, concave lenses, filters, input/output couplers, or any other suitable optical elements that can affect the image light emitted from the display panel 111.

The eye tracking sensor 115 may track the position and movement of the user's eyes. Eye tracking can refer to determining the position of the eyes, including the orientation and position of the eyes relative to the display device 110. In some embodiments, an eye tracking system may include an imaging system for imaging one or more eyes. In some embodiments, the eye tracking system may include a light emitter that generates light that is directed to the eye such that light reflected by the eye can be captured by the imaging system. The eye tracking sensor 115 may transmit eye tracking data ED to the host device 120.

The host device 120 may be a computing device or system that controls the display device 110 to display an image desired by a user on the pixel array 112 from the outside. The host device 120 may transmit image data IS according to content to be presented to the user to the display device 110. In some embodiments, the host device 120 may render content generated when an application is executed as image data IS including a plurality of areas having different display qualities. For example, an image based on the image data IS may include a first area and a second area, the first area may be rendered to have a first quality (e.g., high resolution), and a second area around the first area may be rendered to have a second quality (e.g., low resolution).

The host device 120 may include an image processor 121 that generates image data IS. In some embodiments, the image processor 121 may generate image data IS including a plurality of areas having different display qualities. In some embodiments, the image processor 121 may render the image data IS based on the eye tracking data ED received from the display device 110. The image processor 121 may receive eye tracking data ED from the eye tracking sensor 115 and determine positional information indicating the position of the user's eyes based on the eye tracking data. For example, the image processor 121 may render a first area corresponding to the position of the user's eyes with a first quality, and render a second area surrounding the first area with a second quality.

The host device 120 may transmit a driving control signal CTRL to the display device 110. The driving control signal CTRL may include control commands and setting data for controlling the driving circuit 113 and the optical system 114. In some embodiments, the driving control signal CTRL may include area indication data indicating a plurality of areas of the image represented by the image data IS. In some embodiments, the area indication data may include information about a number of the plurality of areas and/or coordinate data, function data, or the like indicating a location of the plurality of areas within the image represented by the image data IS. For example, if the image displayed by the image data (IS) is divided into a first area and a second area, and the first area is rectangular in shape, the area indication data may include coordinate values (e.g., pixel coordinate values) of the four vertices of the first area.

The display device 110 may drive a plurality of areas of an image displayed by the image data IS in a plurality of ways. Multiple areas can be rendered with multiple qualities. For example, the driving circuit 113 may drive a first area rendered with a first quality and a second area rendered with a second quality in different ways. In some embodiments, the driving circuit 113 may provide a gate signal to the pixel array 112 such that a length of a horizontal period of the gate signal provided to the pixels corresponding to the first area within the pixel array 112 differs from a length of a horizontal period of the gate signal provided to the pixels corresponding to the second area. For example, a horizontal period of a gate signal applied to pixels corresponding to the first area may be 1H, and a horizontal period of a gate signal provided to pixels corresponding to the second area may be ⅓H. In some embodiments, the driving circuit 113 may provide gate signals to the pixels corresponding to the first area such that the horizontal periods of the gate signals do not overlap, and may provide gate signals to the pixels corresponding to the second area such that the horizontal periods of the gate signals overlap each other. For example, the driving circuit 113 may provide gate signals in a raster scan to pixels representing the first area within the pixel array 112, and may provide gate signals with overlapping horizontal periods to pixels connected to a plurality of gate lines among pixels representing the second area.

In some embodiments, the driving circuit 113 may drive pixels corresponding to the second area that are adjacent to the pixels corresponding to the first area and pixels corresponding to the second area that are spaced apart from the pixels corresponding to the first area in different ways. Here, the driving circuit 113 may determine whether pixels corresponding to the second area are adjacent to or separated from the first area based on a distance, the number of pixels, the number of gate lines, and the like. In some embodiments, the driving circuit 113 may apply the same data signal to pixels connected to the same gate line among pixels corresponding to the second area. For example, the driving circuit 113 may apply one of a plurality of data signals corresponding to pixels connected to the same gate line and adjacent to each other among the pixels corresponding to the second area as the same data signal, to pixels connected to the same gate line and adjacent to each other among the pixels corresponding to the second area.

In some embodiments, the driving circuit 113 may provide gate signals with horizontal periods overlapping each other to a first group of gate lines and provide gate signals with horizontal periods overlapping each other to a second gate line group. The first gate line group may include gate lines connected to a first group of the pixels corresponding to the second area and the second gate line group may include gate lines connected to a second group of pixels corresponding to the second area that are adjacent to the first group of pixels. The driving circuit 113 is driven in a low bias state or turned off during the period from after providing gate signals to the first group of gate lines to before providing gate signals to the second group of gate lines. That is, the driving circuit 113 may discontinuously drive the pixels corresponding to the second area.

In some embodiments, the driving circuit 113 may be driven in a low bias state or turned off during a portion of a scan period within one frame period. For example, the driving circuit 113 may be driven in a low bias state or turned off for a period corresponding to the number of gate lines providing gate signals such that horizontal periods of the gate signals overlap each other. That is, the driving circuit 113 may continuously drive pixels corresponding to the second area.

In some embodiments, the display device 110 may identify a plurality of areas based on area indication data. For example, the display device 110 may identify a first area and a second area based on the area indication data, and drive pixels corresponding to the first area and pixels corresponding to the second area in different ways.

Figure 2:
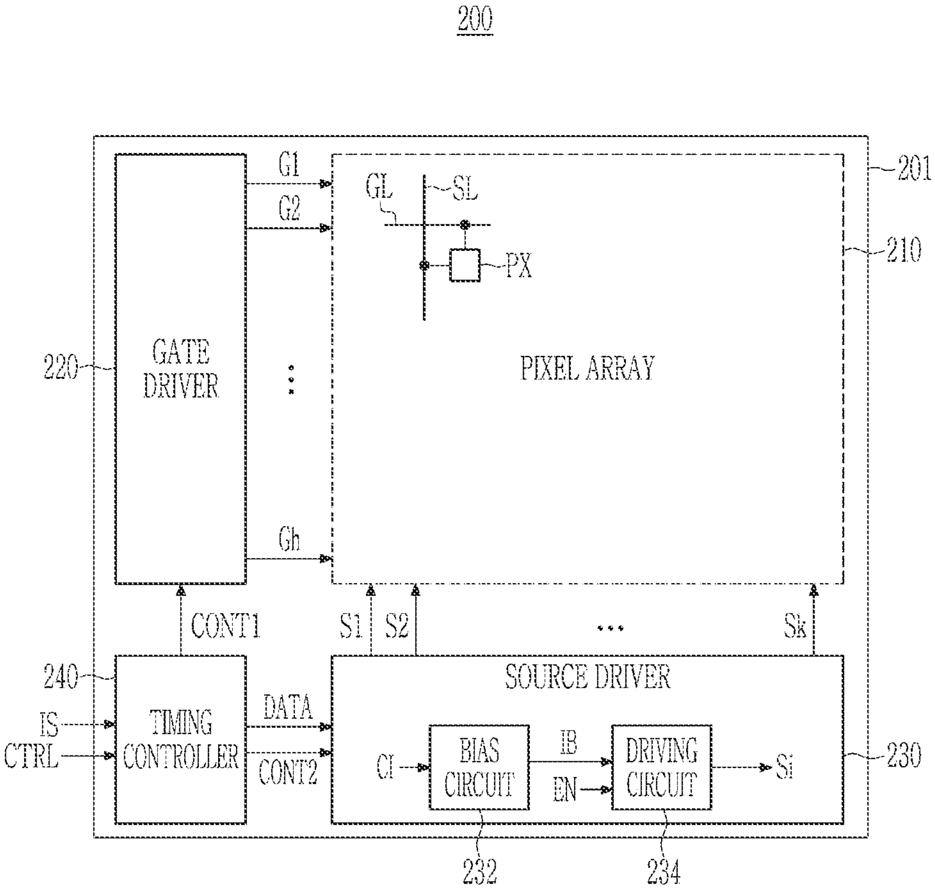
FIG. 2 is a block diagram illustrating a display panel of a display device according to an example embodiment.

FIG. 2 is a block diagram illustrating a display panel of a display device according to an example embodiment.

Referring to FIG. 2, a display device 200 according to an example embodiment includes a substrate 201, a pixel array 210 disposed on the substrate 201, a gate driver 220, a source driver 230, and a timing controller 240.

The pixel array 210 may include a plurality of pixels PX for displaying an image. Each pixel PX may be connected to a corresponding source line SL among a plurality of source lines and a corresponding gate line GL among a plurality of gate lines. Each pixel PX may receive a data signal from the source line SL when a gate signal is supplied to the gate line GL. Each pixel PX may express light of a predetermined luminance corresponding to an input data signal. The plurality of pixels PX may display an image in units of one frame.

In some embodiments, the pixel array 210 may include an OLED array. Each of the pixels PX may include a pixel driving circuit including a driving transistor and an OLED. The driving transistor included in the pixel PX supplies a current corresponding to the data signal to the organic light emitting diode, and accordingly, the organic light emitting diode can emit light with a luminance that corresponds to the data signal. In some embodiments, the pixel array 210 may include a micro LED array. Each of the pixels PX may include a pixel driving circuit including a driving transistor and a micro LED.

In FIG. 2, the pixel PX is illustrated as being connected to one source line SL and one gate line GL, the connection structure of the signal lines of the pixels PX of the display device according to one embodiment is not limited thereto. For example, various signal lines may be additionally connected to correspond to the circuit structure of the pixel PX. In some embodiments, the pixel PX may be implemented in various other forms.

Some or all of the gate driver 220, the source driver 230, and the timing controller 240 may be implemented on the same substrate 201 as the pixel array 210. In some embodiments, the gate driver 220 and/or the source driver 230 may be implemented on the same substrate as the pixel array 210. In this case, the gate driver 220 and/or the source driver 230 may be disposed in the periphery of the pixel array 210. Some or all of the pixel driving circuit, the gate driver 220, the source driver 230, and the timing controller 240 of the pixel array 210 may be manufactured through a silicon wafer manufacturing process.

The gate driver 220 may provide a plurality of gate signals G1, G2, . . . , Gh to the pixel array 210. The plurality of gate signals G1, G2, . . . , Gh may be pulse signals having an enable level and a disable level. The plurality of gate signals G1, G2, . . . , Gh may be applied to the plurality of gate lines GL. When a gate signal having an enable level is applied to the gate line GL connected to the pixel PX, the data signal applied to the source line SL connected to the pixel PX may be transmitted to the pixel PX. In some embodiments, the gate driver 220 may apply the plurality of gate signals G1, G2, . . . , Gh to the plurality of gate lines GL in different ways based on the gate driver control signal CONT1. For example, the gate driver 220 may apply a plurality of gate signals G1, G2, . . . , Gh in different ways to some gate lines connected to pixels (PXs) displaying a first area of the image within pixel array 210 and to other some gate lines connected to pixels (PXs) displaying a second area of the image within pixel array 210.

In some embodiments, the gate driver 220 may provide a plurality of gate signals G1, G2, . . . , Gh such that a horizontal period of a gate signal provided to a gate line of some of the plurality of gate lines GLs differs from a horizontal period of a gate signal provided to a gate line of another of the plurality of gate lines GLs.

In some embodiments, the gate driver 220 may provide a plurality of gate signals G1, G2, . . . , Gh such that the horizontal periods of the gate signals provided to gate lines of some of the plurality of gate lines GLs do not overlap, and the horizontal periods of the gate signals provided to some other gate lines of the plurality of gate lines GLs overlap each other.

In some embodiments, the gate driver 220 may provide gate signals to a second portion of gate lines adjacent to the gate lines of a first portion of the plurality of gate lines GLs such that the horizontal periods of the gate signals provided to the gate lines of the first portion of the plurality of gate lines GL do not overlap each other, and the horizontal periods of the gate signals provided to a first number of gate lines of the second portion that are adjacent the first portion overlap each other, and may provide gate signals to a third portion of gate lines of the second portion that are spaced apart from the gate lines of the first portion of the plurality of gate lines GLs such that a number of the horizontal periods of the gate signals provided to the second number of gate lines that overlap is greater than a number of the horizontal periods of the gate signals provided to the first number of gate lines that overlap.

The source driver 230 may receive data DATA in the form of a digital signal from the timing controller 240 and convert the data DATA into data signals S1, S2, . . . , Sk in the form of an analog signal. Here, the data DATA may include grayscale information corresponding to each pixel PX for displaying the image data IS on the pixel array 210. The source driver 230 may transmit a plurality of data signals S1, S2, . . . , Sk to the pixel array 210 according to the source driver control signal CONT2 provided from the timing controller 240. The source driver 230 may also be referred to as a data driver. In some embodiments, the source driver 230 may apply a plurality of data signals S1, S2, . . . , Sk to the plurality of source lines SL in different ways based on the source driver control signal CONT2. For example, the source driver 230 may apply a plurality of data signals S1, S2, . . . , Sk in different ways to some source lines connected to pixels PX displaying a first area of the image within the pixel array 210 and to other source lines connected to pixels PX displaying a second area of the image within the pixel array 210.

In some embodiments, the source driver 230 may apply the same data signal to a plurality of pixels PXs connected to a plurality of gate lines adjacent to each other. For example, when two pixels PXs are each connected to two adjacent gate lines of a plurality of gate lines GLs, and the two pixels PXs are connected together to one source line, the source driver 230 may apply the same data signal to both pixels PXs. The two pixels PXs may receive the same data signal provided from the source driver 230 while gate signals having overlapping horizontal periods are provided to the two gate lines. The source driver 230 may apply a data signal corresponding to one of the two pixels PXs to the two pixels PXs together, or may interpolate two data signals corresponding to the two pixels PXs to generate a single data signal and apply the generated single data signal to the two pixels PXs together.

In some embodiments, the source driver 230 may apply the same data signal to a plurality of pixels PXs connected to a plurality of source lines adjacent to each other. For example, when three pixels PXs are connected to each of three adjacent source lines of a plurality of source lines SL, and the three pixels PXs are connected together to one gate line, the source driver 230 may apply the same data signal to the three pixels PXs.

In some embodiments, the source driver 230 is driven in a low bias state or turned off for a period corresponding to the number of gate lines provided with gate signals whose horizontal periods overlap during a scan period within one frame period according to the frame frequency. Here, the scan period (SCAN PERIOD) may refer to a period which includes the horizontal periods of the plurality of gate signals G1, G2, . . . , Gh when the plurality of gate signals G1, G2, . . . , Gh are applied so as not to overlap each other.

In some embodiments, source driver 230 may include bias circuit 232 and source driving circuit 234. The bias circuit 232 may generate a bias current IB used to drive the source driving circuit 234. The bias circuit 232 may control the magnitude of the bias current IB based on a current control signal CI included in the source driver control signal CONT2.

The source driving circuit 234 may be operated in a normally biased state during a period during which a gate signal is applied to a first gate line group including gate lines connected to a first group of pixels PXs that represent a second area of the image, and during a period during which a gate signal is applied to a second gate line group including gate lines connected to a second group of pixels adjacent to the first group of pixels of the pixels PXs representing the second area of the image. That is, based on the current control signal CI, the bias circuit 232 may generate a bias current IB of a first magnitude during a period which a gate signal is applied to the first group of gate lines and a period which a gate signal is applied to the second group of gate lines. The source driving circuit 234 may be driven in a low bias state from after the gate signal is applied to the first gate line group until before the gate signal is applied to the second gate line group. That is, the bias circuit 232 may generate a bias current IB of a second magnitude that is smaller than the first magnitude from after the gate signal is applied to the first group of gate lines until before the gate signal is applied to the second group of gate lines.

The source driving circuit 234 may operate based on the bias current IB and the enable signal EN. The source driving circuit 234 may output the data signal Si in an on state. The source driving circuit 234 may operate in an on state when the enable signal EN is applied. The source driving circuit 234 may operate in a low bias state according to the magnitude of the bias current IB in the on state. The source driving circuit 234 may operate in an off state when the enable signal EN is not applied.

The timing controller 240 may receive the image data IS and the driving control signal CTRL from the host device (120 in FIG. 1), and control the gate driver 220 and the source driver 230. The driving control signal CTRL provided from the host device may include a control command for controlling the gate driver 220 and the source driver 230, setting data, area indication data, and the like. The timing controller 240 may control the gate driver 220 and the source driver 230 based on the driving control signal CTRL. For example, the driving control signal CTRL may include a horizontal synchronization signal HSYNC, a vertical synchronization signal VSYNC, a main clock signal MCLK, and a data enable signal DE. The timing controller 240 may generate data DATA by dividing the image data IS into frame units based on a vertical synchronization signal VSYNC, and by dividing the image data IS into gate line units based on the horizontal synchronization signal HSYNC. The timing controller 240 may send a gate driver control signal CONT1 and a source driver control signal CONT2 to the gate driver 220 and the source driver 230 to perform control, for example, to synchronize the operation of the source driver 230 and the gate driver 220. The timing controller 240 may control the gate driver 220 and the source driver 230 based on control commands that it generates independently of, or in addition to, the drive control signal (CTRL) received from the host device.

According to some embodiments, for a period corresponding to the number of gate lines providing gate signals such that the horizontal periods of the gate signals overlap each other, the source driver 230 may be driven into a low bias state, or remain off, to reduce power consumption.

Figure 3:
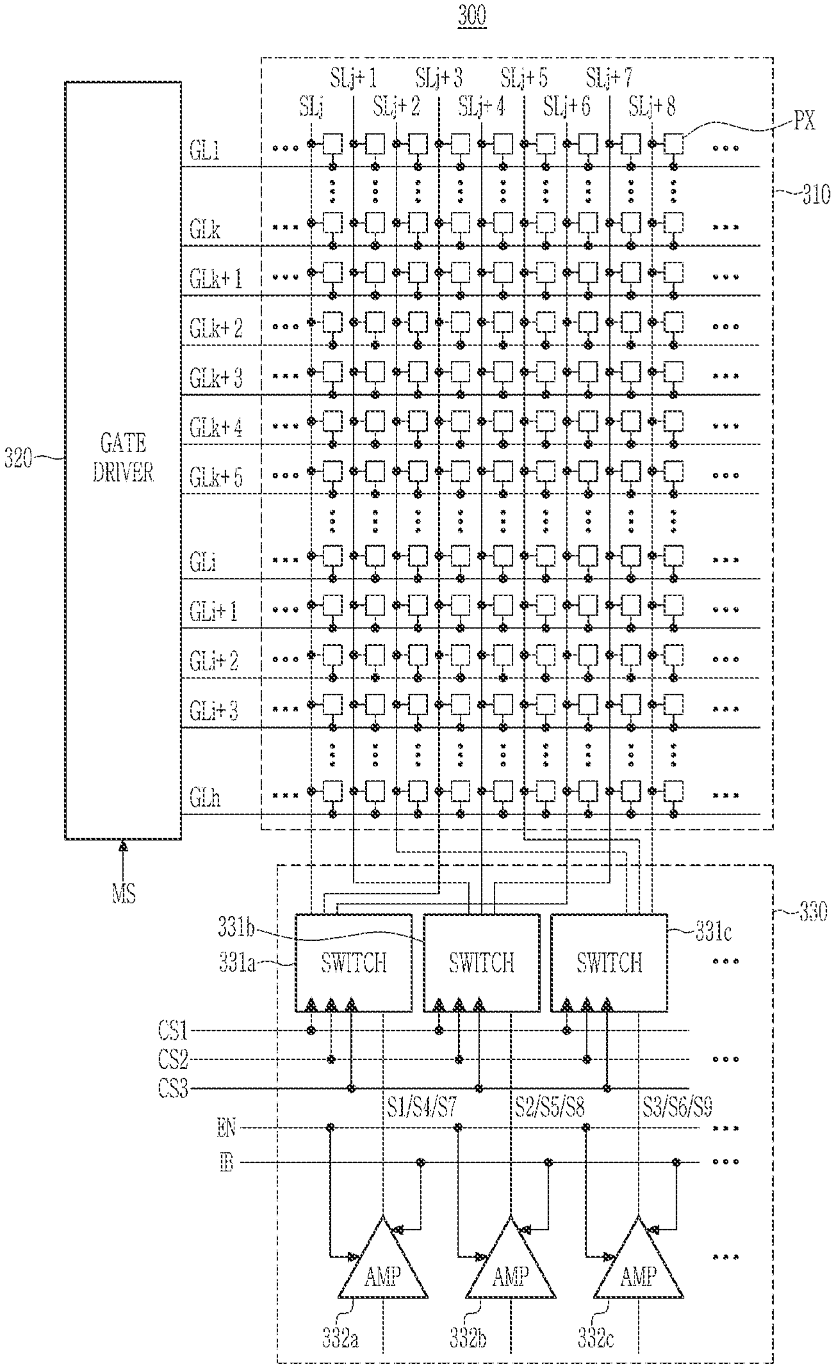
FIG. 3 is a block diagram illustrating a portion of a display panel according to an example embodiment.

FIG. 3 is a block diagram illustrating a portion of a display panel according to an example embodiment.

The display panel 300 may include a pixel array 310, a gate driver 320, and a source driver 330. The pixel array 310 may include a plurality of pixels PX, and a plurality of gate lines GL1, . . . , GLh and a plurality of source lines SLj, . . . , SLj+8 connected to the plurality of pixels PXs.

The gate driver 320 may receive the mode control signal MS and drive the plurality of gate lines GL1, . . . , GLh based on the mode control signal MS. In some embodiments, the mode control signal MS may include information about at least one gate line corresponding to the first area. For example, the mode control signal MS may include information about gate lines corresponding to the boundary of the first area. In some embodiments, the mode control signal MS may include information about the horizontal period. For example, the mode control signal MS may include information about a horizontal period of a gate signal applied to gate lines corresponding to the second area. In some embodiments, the mode control signal MS may include information about the number of gate lines to which gate signals having overlapping horizontal periods are applied. For example, the mode control signal MS may instruct the gate driver 220 such that the horizontal periods of gate signals applied to the three gate lines by the gate driver 220 overlap. In some embodiments, the mode control signal MS may instruct the gate driver 220 to operate in a low power driving mode for low power driving of the display device 110. For example, the mode control signal MS may instruct the gate driver 220 to operate in one of a first mode of continuously applying gate signals having overlapping horizontal periods to gate lines corresponding to the second area; and a second mode in which gate signals are discontinuously applied to different groups of gate lines corresponding to the second area while applying gate signals having overlapping horizontal periods to gate lines in the same group. In addition, the mode control signal MS may instruct the gate driver 220 to operate in a normal driving mode for normal driving of the display device 110. For example, the mode control signal MS may instruct the gate driver 220 to operate in normal drive mode, where the gate driver applies gate signals with non-overlapping horizontal periods to all gate lines.

The source driver 330 may include a plurality of switches 331*a*, 331*b*, and 331*c* and a plurality of amplifiers 332*a*, 332*b*, and 332*c*. Each of the plurality of switches 331*a*, 331*b*, and 331*c* may be connected to a corresponding amplifier among the plurality of amplifiers 332*a*, 332*b*, and 332*c*. For example, switch 331*a* may be connected to amplifier 332*a*. Each of the plurality of switches 331*a*, 331*b*, and 331*c* may be connected to a plurality of source lines. For example, the switch 331*a* may be connected to the source lines SLj, SLj+3 and SLj+6. Each of the plurality of switches 331*a*, 331*b*, and 331*c* may select at least one of the source lines based on the control signals CS1, CS2, and CS3, and may transmit a signal output from an amplifier corresponding to the selected at least one source line. For example, when an enable level control signal CS1 is applied to the switch 331*a*, the switch 331*a* may transmit the data signal S1 output from the amplifier 332*a* to the source line SLj, when an enable level control signal CS2 is applied to the switch 331*a*, the switch 331*a* may transmit the data signal S2 output from the amplifier 332*a* to the source line SLj+3, and when an enable level control signal CS3 is applied to the switch 331*a*, the switch 331*a* may transmit the data signal S3 output from the amplifier 332*a* to the source line SLj+6. The number of control signals CS1, CS2, and CS3 received by the switch 331*a* may be the same as the number of source lines SLj, SLj+3, and SLj+6 connected to the switch 331*a*. When the enable level control signals CS1, CS2, and CS3 are applied to the switch 331*a*, the switch 331*a* may transmit the data signal S1, S2, or S3 output from the amplifier 332*a* to the source lines SLj, SLj+3, SLj+6.

Each of the plurality of amplifiers 332*a*, 332*b*, and 332*c* may output a plurality of data signals corresponding to a plurality of source lines. For example, the amplifier 332*a* may output data signals S1, S4, and S7 corresponding to the source lines SLj, SLj+3, and SLj+6. Each of the plurality of amplifiers 332*a*, 332*b*, and 332*c* may receive the enable signal EN and may be turned on or off according to the level of the enable signal EN. Each of the plurality of amplifiers 332*a*, 332*b*, and 332*c* may receive a bias current IB in an on state. Each of the plurality of amplifiers 332*a*, 332*b*, and 332*c* may operate in a low bias state according to the magnitude of the bias current IB in the on state.

Figure 4:
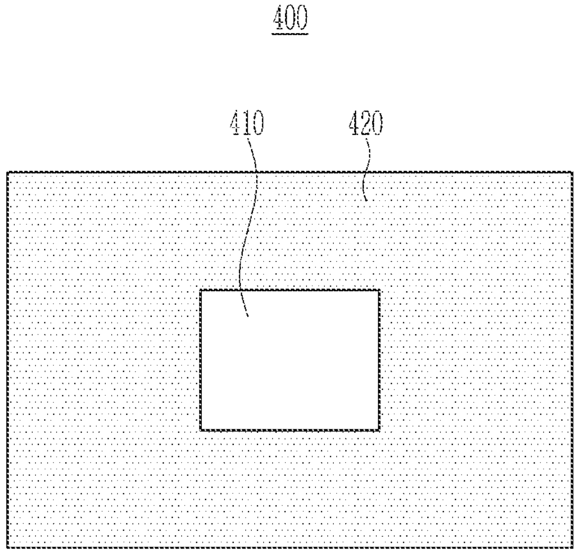
FIG. 4 illustrates an image displayed by a display device according to an example embodiment.

FIG. 4 illustrates an image displayed by a display device according to an example embodiment.

Referring to FIG. 4, an image 400 may include a first area 410 and a second area 420. The first area 410 may be an area rendered with a first quality, and a second area around the first area may be an area rendered with a second quality. The first and second areas 410 and 420 having different respective rendering qualities that may be variously modified, resolutions, or scales. Also, different rendering qualities of the first and second areas 410 and 420 may be dynamically changed. The first area 410 and the second area 420 may be rendered at 10× and 4× quality, respectively.

If the user's gaze (e.g., focus or gaze position) is known based on the eye tracking data (ED in FIG. 1), the first area 410 may include a focus area where the user's gaze is resting or fixated. The size of the focus area may be based on an arc/angle covered by the user's line of sight. For example, the arc covered by the line of sight may be 20 degrees, or the arc covered by the line of sight may be an arc/angle between 5 degrees and 20 degrees. Thus, the focus area may be based on the arc covered by the line of sight and the viewing distance to the rendered content. In some embodiments, the size of the focus area may be based on an amount of movement of the user's gaze (e.g., increasing movement of the user's gaze increases the size of the focus area).

Figure 5:
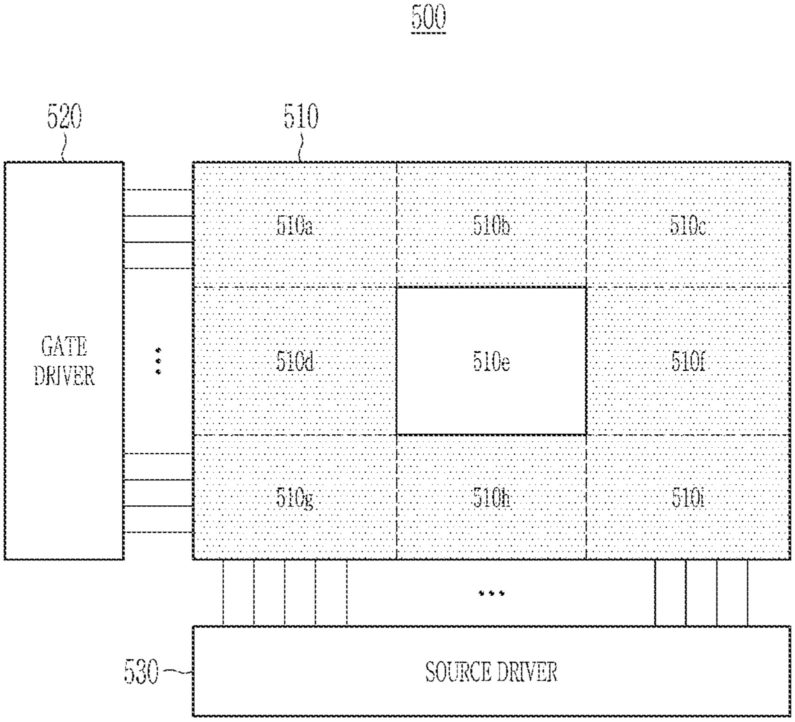
FIG. 5 illustrates a display panel displaying the image of FIG. 4 according to an example embodiment.

FIG. 5 illustrates a display panel displaying the image of FIG. 4 according to an example embodiment.

Referring to FIG. 5, the image 400 of FIG. 4 may be displayed on the pixel array 510 of the display panel 500. The area 510*e* of the pixel array 510 corresponding to the first area 410 of the image 400 and the areas 510*a*, . . . , 510*d*, 510*f*, . . . , 510*i* of the pixel array 510 corresponding to the second area 420 of the image 400 may be driven in different ways.

The gate driver 520 may drive the gate lines connected to the area 510*e* and the gate lines connected to the areas 510*a*, . . . , 510*c*, and 510*g*, . . . , 510*i* in different ways. In this case, gate lines connected to area 510*e* may also be connected to areas 510*d* and 510*f*. The gate driver 520 may provide gate signals to the pixel array 510, such that the horizontal period of the gate signals provided to the gate lines connected to area 510*e* is different from the horizontal period of the gate signals provided to the gate lines connected to areas 510*a*, . . . , 510*c*, and 510*g*, . . . , 510*i*. The gate driver 520 may provide gate signals to the pixel array 510 such that the gate signals provided to the gate lines connected to area 510*e* do not overlap, and the gate signals provided to the gate lines connected to areas 510*a*, . . . , 510*c*, and 510*g*, . . . , 510*i* overlap each other. For example, horizontal periods of gate signals provided to gate lines connected to area 510*e* may not overlap with each other, while horizontal periods of gate signals provided to gate lines connected to areas 510*a*, . . . , 510*c*, and 510*g*, . . . , 510*i* may overlap with each other. In some embodiments, horizontal periods of gate signals applied to a plurality of adjacent gate lines among the gate lines connected to the areas 510*a*, . . . , 510*c*, and 510*g*, . . . , 510*i* may overlap each other.

When the gate driver 520 applies overlapping gate signals to a plurality of gate lines (e.g., a first gate line group) among the gate lines connected to the areas 510*a*, . . . , 510*c*, and 510*g*, . . . , 510*i* and then applies overlapping gate signals to a plurality of gate lines (e.g., a second gate line group) among the gate lines connected to the areas 510*a*, . . . , 510*c*, and 510*g*, . . . , 510*i*, the gate driver 520 may provide the gate signals to the pixel array 510 such that a period of time after applying the gate signals to the first gate line group and before applying the gate signals to the second gate line group is longer than a horizontal period of the gate signals.

The source driver 530 may drive source lines while gate signals are applied to areas 510*a*, . . . , 510*c*, and 510*g*, . . . , 510*i* and source lines while gate signals are applied to areas 510*d*, . . . , 510*f* in different ways. The source driver 530 may apply the same data signal to pixels connected to the same source line while gate signals are applied to areas 510*a*, . . . , 510*c*, and 510*g*, . . . , 510*i*, and may apply different data signals to pixels connected to the same source line while gate signals are applied to areas 510*d*, . . . , 510*f*. The source driver 530 may apply the same data signal to a plurality of pixels connected to a plurality of source lines adjacent to each other among the source lines connected to the areas 510*a*, . . . , 510*c*, and 510*g*, . . . , 510*i*, while the gate signals are applied to the areas 510*a*, . . . , 510*c*, and 510*g*, . . . , 510*i*.

The source driver 530 may be driven in a low bias state or turned off during a period corresponding to the number of gate lines provided with gate signals whose horizontal periods overlap during a scan period within one frame period according to the frame frequency.

Figure 6:
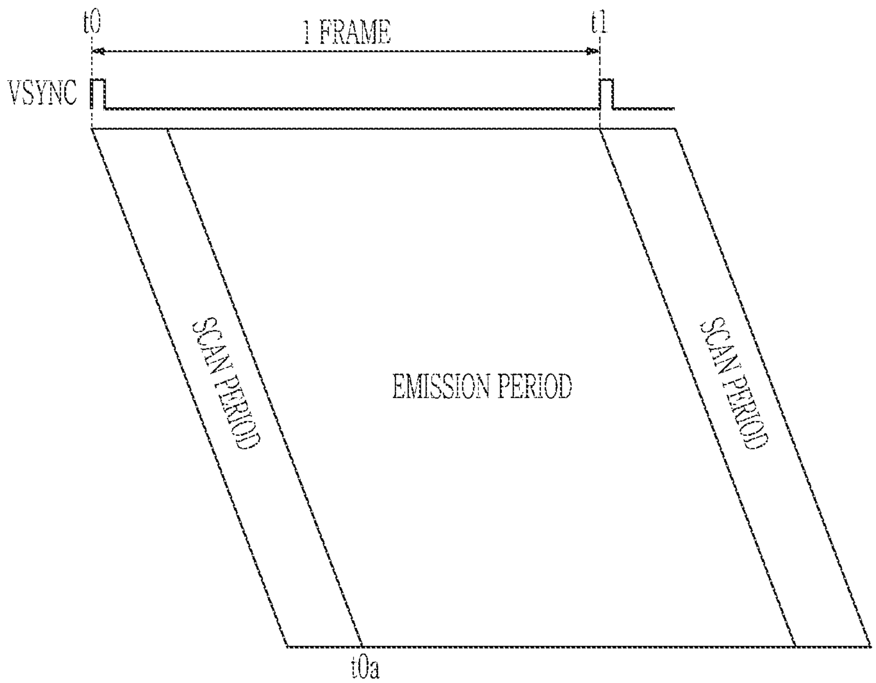
FIG. 6 illustrates one frame period of a display device according to an example embodiment.

FIG. 6 illustrates one frame period of a display device according to an example embodiment.

In FIG. 6, the gate driver (220 of FIG. 2) may operate in the second mode in which gate signals are discontinuously applied to different groups of gate lines corresponding to the second area while applying gate signals having overlapping horizontal periods to gate lines in the same group. The display device (200 in FIG. 2) may display an image in a cycle of one frame (1 FRAME) in synchronization with the vertical synchronization signal VSYNC included in the drive control signal CTRL. A period of one frame (1 FRAME) may be a period between t0 and t1. When the enable level of the vertical synchronization signal VSYNC is applied at t0, a scan period (SCAN PERIOD) for providing gate signals and data signals to the pixel array (210 in FIG. 2) may be started. The scan period (SCAN PERIOD) may end at ta. The length of the scan period (SCAN PERIOD) in the second mode may be substantially the same as the scan period (SCAN PERIOD) in the normal driving mode in which gate signals with non-overlapping horizontal periods are applied to all gate lines.

The source driver (230 in FIG. 2) may operate in an on state during the scan period (SCAN PERIOD) between t0 and t0*a*, and operate in an off state when the scan period (SCAN PERIOD) ends at t0*a*. In some embodiments, the source driver 230 may alternately operate in a low bias state and a normal bias state during the scan period (SCAN PERIOD). During the emission period (EMISSION PERIOD), the pixel array 210 may emit light with luminance corresponding to the data signal.

Figure 7:
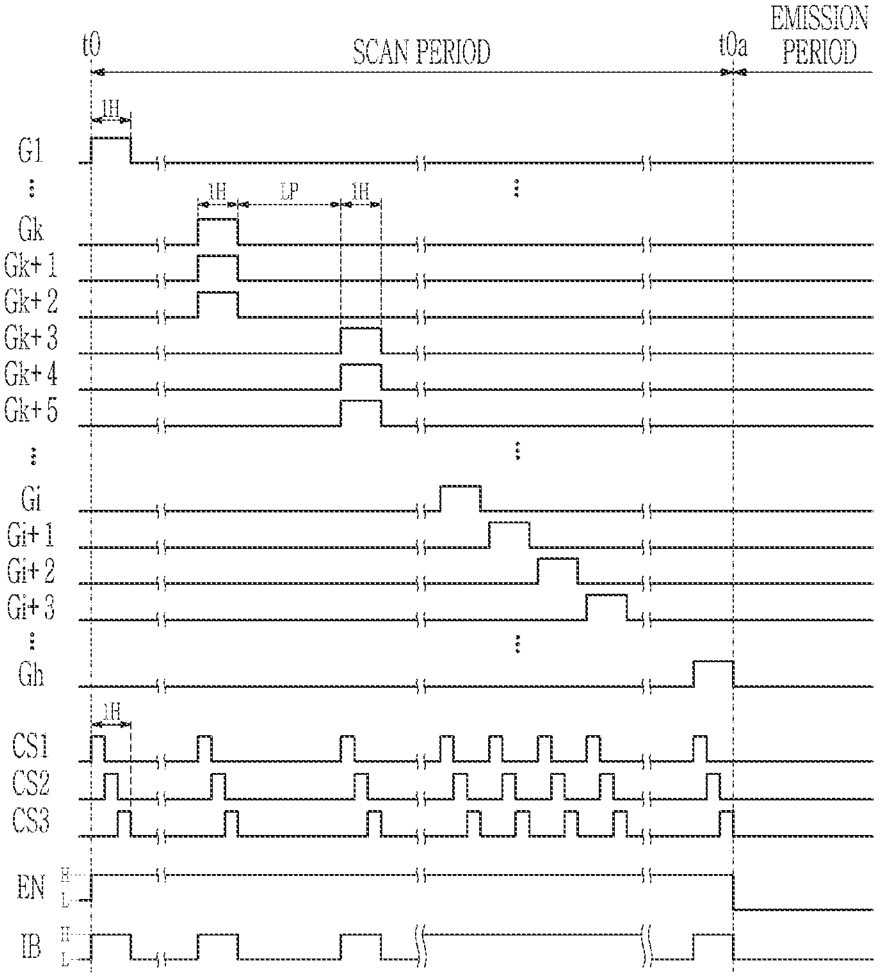
FIG. 7 is a timing diagram illustrating a scan period of a display device according to an example embodiment.

FIG. 7 is a timing diagram illustrating a scan period of a display device according to an example embodiment.

Referring to FIGS. 3 and 7 together, during the scan period (SCAN PERIOD) between t0 and t0*a*, the gate driver 320 may apply a plurality of gate signals G1, . . . , Gh to the plurality of gate lines GL1, . . . , GLh, respectively. The gate lines GL1, . . . , GLk+5, GLh may be connected to pixels PXs displaying a second area of the image in the pixel array 310, and the gate lines GLi, . . . , GLi+3 may be connected to pixels PXs displaying a first area of the image in the pixel array 310. The gate driver 320 may apply gate signals G1, . . . , Gk+5, and Gh overlapping each other with horizontal periods 1H to the gate lines GL1, . . . , GLk+5, and GLh. For example, the gate driver 320 may provide gate signals Gk to Gk+2, Gk+3 to Gk+5 that overlap each other by a horizontal period 1H in units of three gate lines GLk to GLk+2, GLk+3 to GLk+5. For example, during one horizontal period 1H, a gate signal may be applied to each of gate lines GLk to GLk+2, and during another horizontal period 1H, a gate signal may be applied to each of gate lines GLk+3 to GLk+5.

In some embodiments, the gate driver 320 may output the gate signals Gk, . . . , Gk+5 such that the horizontal blanking period LP between two groups of gate lines GLK, GLk+1 and GLk+2, and GLk+3, GLk+4 and GLk+5 driven sequentially is longer than the horizontal period 1H of each of the gate signals Gk, . . . , Gk+5. For example, when the gate driver 320 applies gate signals with overlapping horizontal periods 1H to a plurality of gate lines GLk, GLk+1, GLk+2 of gate lines GL1, . . . , GLk+5, and GLh, and then applies gate signals with overlapping horizontal periods 1H to the plurality of gate lines GLk+3, GLk+4, GLk+5 of gate lines GL1, . . . , GLk+5, and GLh, the gate driver 320 may output the gate signals Gk, . . . , Gk+5 such that the horizontal blanking period LP from after applying the gate signals Gk, Gk+1, Gk+2 to before applying the gate signals Gk+3, Gk+4, Gk+5 is greater than the horizontal period 1H of each of the gate signals Gk, . . . , Gk+5. The gate driver 320 may apply gate signals Gi, . . . , Gi+3 that do not overlap each other in horizontal periods 1H to the gate lines GLi, . . . , GLi+3.

The enable signal EN may be provided at an enable level (H, high level) during the scan period (SCAN PERIOD). The bias current IB may be applied at a high level H in each of the horizontal periods 1H of the gate signals, and at a low level L during the horizontal blanking period LP between the horizontal periods 1H of the gate signals. Each of the control signals CS1, CS2, and CS3 may have an enable level in each of the horizontal periods 1H of the gate signals. Periods in which each of the control signals CS1, CS2, and CS3 have enable levels that do not overlap each other. For example, when the enable period of control signal CS1 ends, the enable period of control signal CS2 may start, and when the enable period of control signal CS2 ends, the enable period of control signal CS3 may start.

In FIG. 7, it is shown that the horizontal periods of signals applied to three gate lines (GLk, GLk+1, and GLk+2) overlap, but embodiments are not limited thereto, and can also be applied to overlapping horizontal periods of the signals applied to other sized groups of gate lines, such as two, four, five, etc.

According to an embodiment, because the source driver 330 is in a low bias state during the horizontal blanking periods LPs, power consumption is reduced compared to when the source driver 330 is in a normal bias state during the scan period (SCAN PERIOD).

In some embodiments, the source driver 330 may be turned off during horizontal blanking periods LPs. In this case, the enable signal EN may be applied with a disable level in the horizontal blanking periods LP.

Figure 8:
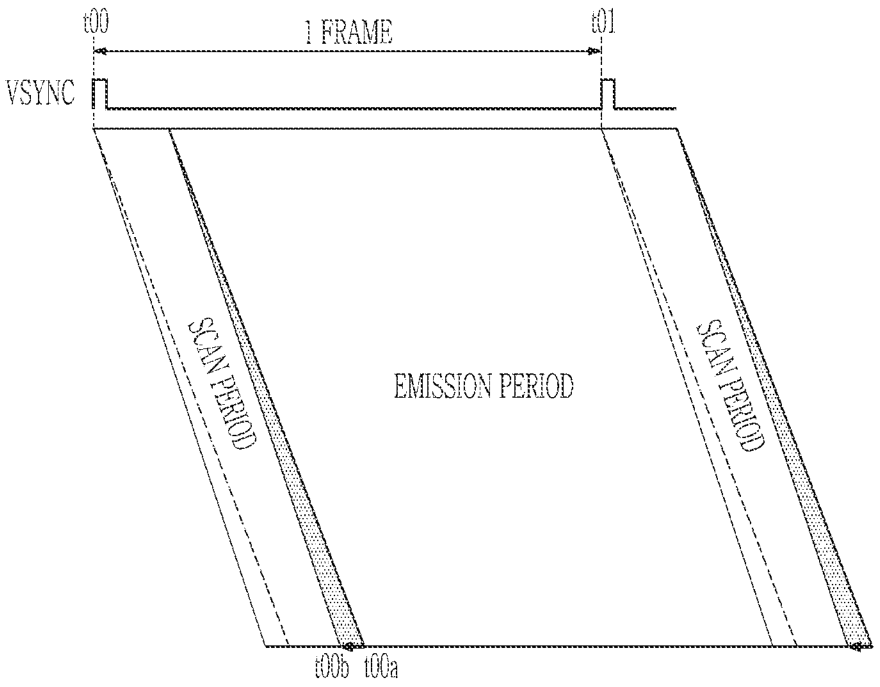
FIG. 8 illustrates one frame period of a display device according to an example embodiment.

FIG. 8 illustrates one frame period of a display device according to an example embodiment.

Referring to FIG. 8, the display device 200 of FIG. 2 may display an image in a one frame cycle in synchronization with a vertical synchronization signal VSYNC included in the drive control signal CTRL. A period of one frame 1 FRAME may be a period between t00 and t01. When the enable level vertical synchronization signal VSYNC is applied at t00, the display device 200 of FIG. 2 may initiate a scan period (SCAN PERIOD) in which a gate signal and a data signal are provided to the pixel array 210 of FIG. 2.

The source driver (230 in FIG. 2) may operate in an on state during the scan period (SCAN PERIOD) between t00 and t00*b*, and operate in an off state when the scan period (SCAN PERIOD) ends at t00*b*. During the emission period (EMISSION PERIOD), the pixel array 210 may emit light with luminance corresponding to the data signal. One frame period of FIG. 8 may be the same as one frame period of FIG. 6. The scan period (SCAN PERIOD) of FIG. 8 may have a shorter time length than the scan period (SCAN PERIOD) of FIG. 6. That is, while the scan period (SCAN PERIOD) of FIG. 6 ends at 100*a* of FIG. 8, the scan period (SCAN PERIOD) of FIG. 8 may end at t00*b*. During a period between t00*b* and t00*a* (hereinafter, referred to as an off period), the gate driver 220 and the source driver 230 may be in an off state (or a low bias state).

Figure 9:
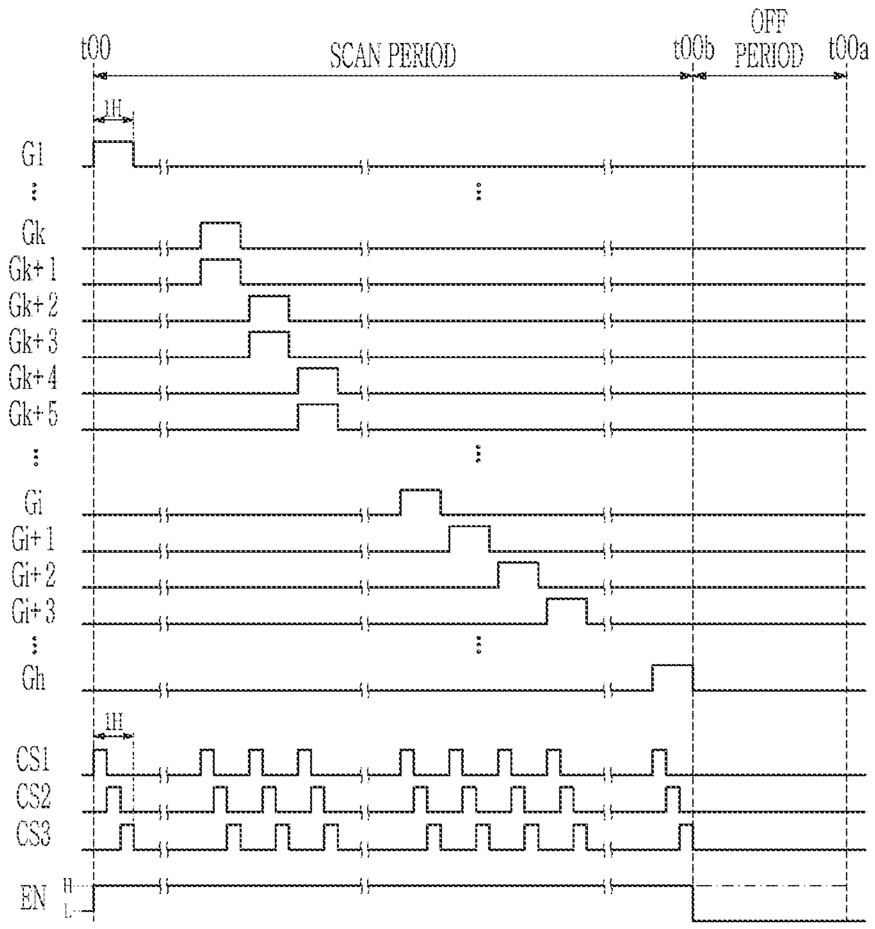
FIG. 9 is a timing diagram illustrating a scan period of a display device according to an example embodiment.

FIG. 9 is a timing diagram illustrating a scan period of a display device according to an example embodiment.

Referring to FIGS. 3 and 9 together, during the scan period (SCAN PERIOD) between t00 and t00*b*, the gate driver 320 may apply a plurality of gate signals G1, . . . , Gh to the plurality of gate lines GL1, . . . , GLh. The gate lines GL1, . . . , GLk+5, GLh may be connected to pixels PX displaying a second area of the image in the pixel array 310, and the gate lines GLi, . . . , GLi+3 may be connected to pixels PX displaying a first area of the image in the pixel array 310. The gate driver 320 may apply gate signals G1, . . . , Gk+5, and Gh overlapping each other with horizontal periods 1H to the gate lines GL1, . . . , GLk+5, and GLh. For example, the gate driver 320 may apply gate signals Gk and Gk+1, Gk+2 and Gk+3, Gk+4 and Gk+6 overlapping each other with horizontal periods 1H in units of two gate lines GLk and GLk+1, GLk+2 and GLk+3, GLk+4 and GLk+6. The gate driver 320 may apply gate signals Gi, . . . , Gi+3 that do not overlap each other in horizontal periods 1H to the gate lines GLi, . . . , GLi+3. For example, during one horizontal period 1H, a gate signal may be applied to each of gate lines GLk and GLk+1, during another horizontal period 1H, a gate signal may be applied to each of gate lines GLk+2 and GLk+3, and during another horizontal period 1H, a gate signal may be applied to each of gate lines GLk+4 and GLk+5.

The enable signal EN may be provided at the enable level (H, high level) during the scan period (SCAN PERIOD) and at the disable level (L, low level) during the off period (OFF PERIOD) between t00*b* and t00*a*. Each of the control signals CS1, CS2, and CS3 may have an enable level in each of the horizontal periods 1H of the gate signals. Periods in which each of the control signals CS1, CS2, and CS3 have enable levels that do not overlap each other.

According to an embodiment, because the source driver 330 is in an off state (or in a low-biased state) during the off period (OFF PERIOD), power consumption may be reduced compared to if the source driver 330 is in an on state during the scan period (SCAN PERIOD) between t00 and t00*a* in normal operation mode.

Figure 10:
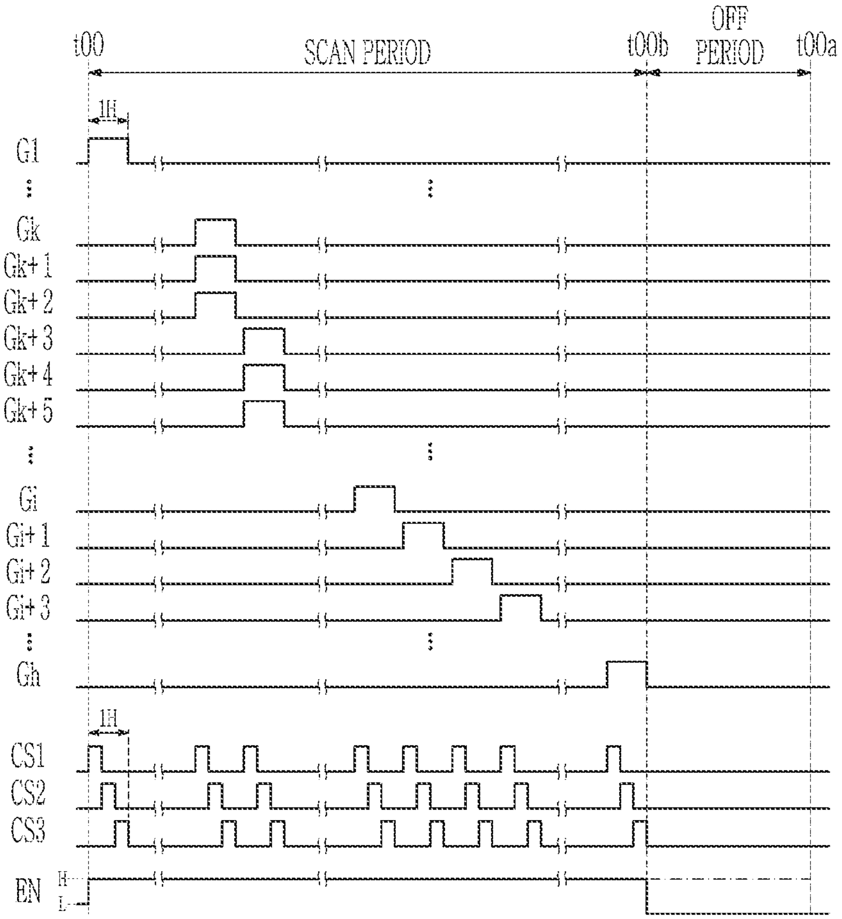
FIG. 10 is a timing diagram illustrating a scan period of a display device according to an example embodiment.

FIG. 10 is a timing diagram illustrating a scan period of a display device according to an example embodiment.

Compared to FIG. 9, the gate driver 320 may apply gate signals Gk, . . . , Gk+2 and Gk+3, . . . , Gk+5 that overlap each other by a horizontal period 1H in units of three gate lines (GLk, . . . , GLk+2 and GLk+3, . . . , and Gk+5). For example, during one horizontal period 1H, a gate signal may be applied to each of gate lines GLk to GLk+2, and during another horizontal period 1H, a gate signal may be applied to each of gate lines GLk+3 to GLk+5.

According to an example embodiment, because the off period (OFF PERIOD) of FIG. 10 is longer compared to the off period (OFF PERIOD) of FIG. 9, and the source driver 330 is in the OFF state during the off period (OFF PERIOD), power consumption may be reduced compared to FIG. 9 and compared to when the source driver 330 is in the on state during the scan period (SCAN PERIOD) between t00 and t00*a* in the normal operation mode.

Figure 11:
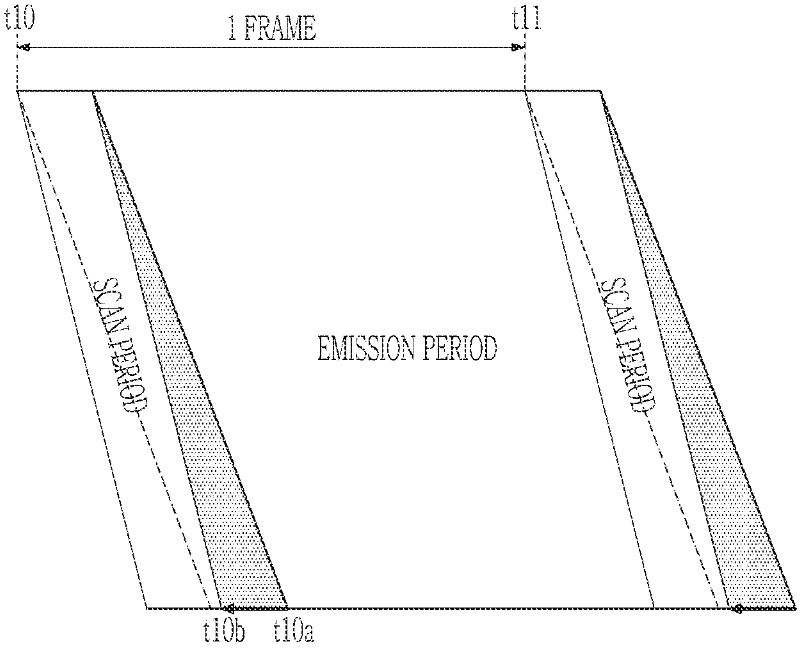
FIG. 11 illustrates one frame period of a display device according to an example embodiment.

FIG. 11 illustrates one frame period of a display device according to an example embodiment.

Referring to FIG. 11, the display device (200 in FIG. 2) may display an image in a cycle of one frame (1 FRAME)

in synchronization with the vertical synchronization signal VSYNC included in the drive control signal CTRL. A period of one frame (1 FRAME) may be a period between t10 and t11. The display device 200 of FIG. 2 may initiate a scan period (SCAN PERIOD) in which gate signals and data signals are provided to the pixel array 210 of FIG. 2 when an enable-level vertical synchronization signal VSYNC is applied at time t10. The source driver (230 in FIG. 2) may operate in an on state during the scan period (SCAN PERIOD) between t10 and t10*b*, and operate in an off state when the scan period (SCAN PERIOD) ends at t10*b*. During the emission period (EMISSION PERIOD), the pixel array 210 may emit light with luminance corresponding to the data signal. One frame period of FIG. 11 may be the same as one frame period of FIGS. 6 and 8. The scan period (SCAN PERIOD) of FIG. 11 may have a shorter time length than the scan period (SCAN PERIOD) of FIG. 8. That is, while the scan period (SCAN PERIOD) of FIG. 8 ends at t10*a* of FIG. 11, the scan period (SCAN PERIOD) of FIG. 11 may end at t10*b*. During an off period between t10*b* and t10*a*, the gate driver 220 and the source driver 230 may be in an off state.

Figure 12:
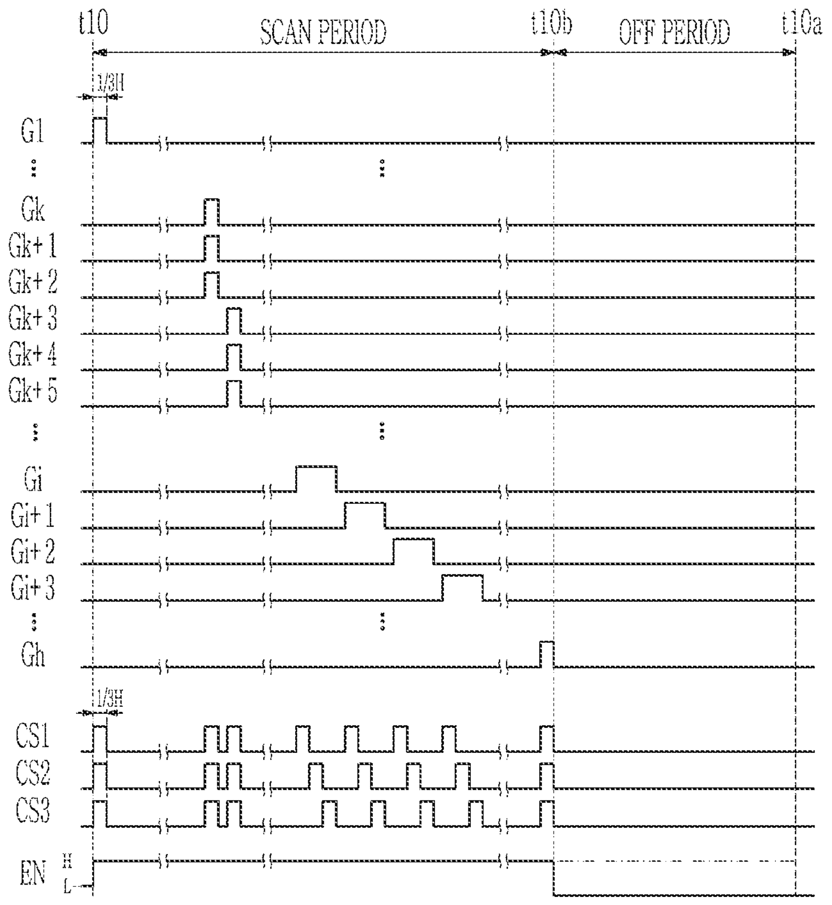
FIG. 12 is a timing diagram illustrating a scan period of a display device according to an example embodiment.

FIG. 12 is a timing diagram illustrating a scan period of a display device according to an example embodiment.

Referring to FIGS. 3 and 12 together, during the scan period (SCAN PERIOD) between time t10 and time t10*b*, the gate driver 320 may apply a plurality of gate signals G1, . . . , Gh to the plurality of gate lines GL1, . . . , GLh. The gate lines GL1, . . . , GLk+5, GLh may be connected to pixels PXs displaying a second area of the image in the pixel array 310, and the gate lines GLi, . . . , GLi+3 may be connected to pixels PXs displaying a first area of the image in the pixel array 310. The gate driver 320 may apply a plurality of gate signals G1, . . . , Gh such that the length of the horizontal period ⅓H of the gate signals G1, . . . , Gk+5, Gh provided to the gate lines GL1, . . . , GLk+5, GLh differs from the length of the horizontal period 1H of the gate signals Gi, . . . , Gi+3 provided to the gate lines GLi, . . . , GLi+3. The gate driver 320 may apply gate signals G1, . . . , Gk+5, and Gh overlapping each other with horizontal periods (⅓H) to the gate lines GL1, . . . , GLk+5, and GLh. The gate driver 320 may apply gate signals Gk and Gk+1, Gk+2 and Gk+3, Gk+4 and Gk+5 that overlap each other by a horizontal period 1H in three gate lines GLk and GLk+1, GLk+2 and GLk+3, Gk+4 and Gk+5. For example, during one horizontal period 1H, a gate signal may be applied to each of gate lines GLk to GLk+2, and during another horizontal period 1H, a gate signal may be applied to each of gate lines GLk+3 to GLk+5. The gate driver 320 may apply gate signals Gi, . . . , Gi+3 that do not overlap each other in horizontal periods 1H to the gate lines GLi, . . . , GLi+3.

The enable signal EN may be provided as an enable level (H, high level) during the scan period (SCAN PERIOD) and as a disable level (L, low level) during the off period (OFF PERIOD) between time t10*b* and time t10*a*.

The control signals CS1, CS2, and CS3 may have an enable level in each of the horizontal periods ⅓H of the gate signals G1, . . . , Gk+5, and Gh. In this case, periods in which the control signals CS1, CS2, and CS3 have enable levels may overlap each other. The same data signal S1/S4/S7, S2/S5/S8, S3/S6/S9 may be applied to the source lines SLj, SLj+3, SLj+6/SLj+1, SLj+4, SLj+7/SLj+2, SLj+5, SLj+8 connected to each of the switches 331*a*, 331*b*, 331*c* at the same time. For example, the switch 331*a* may simultaneously apply the data signal S1 to the source lines SLj, SLj+3, and SLj+6. Each of the control signals CS1, CS2, and CS3 may have an enable level in each of the horizontal periods 1H of the gate signals Gi, . . . , Gi+3. In this case, periods in which each of the control signals CS1, CS2, and CS3 have enable levels that do not overlap each other.

According to an example embodiment, because the source driver 330 is in an off state during the off period (OFF PERIOD), normal operation mode, power consumption may be reduced compared to when the source driver 330 is in the on state during the scan period (SCAN PERIOD) between t10 and t10*a*.

Figure 13:
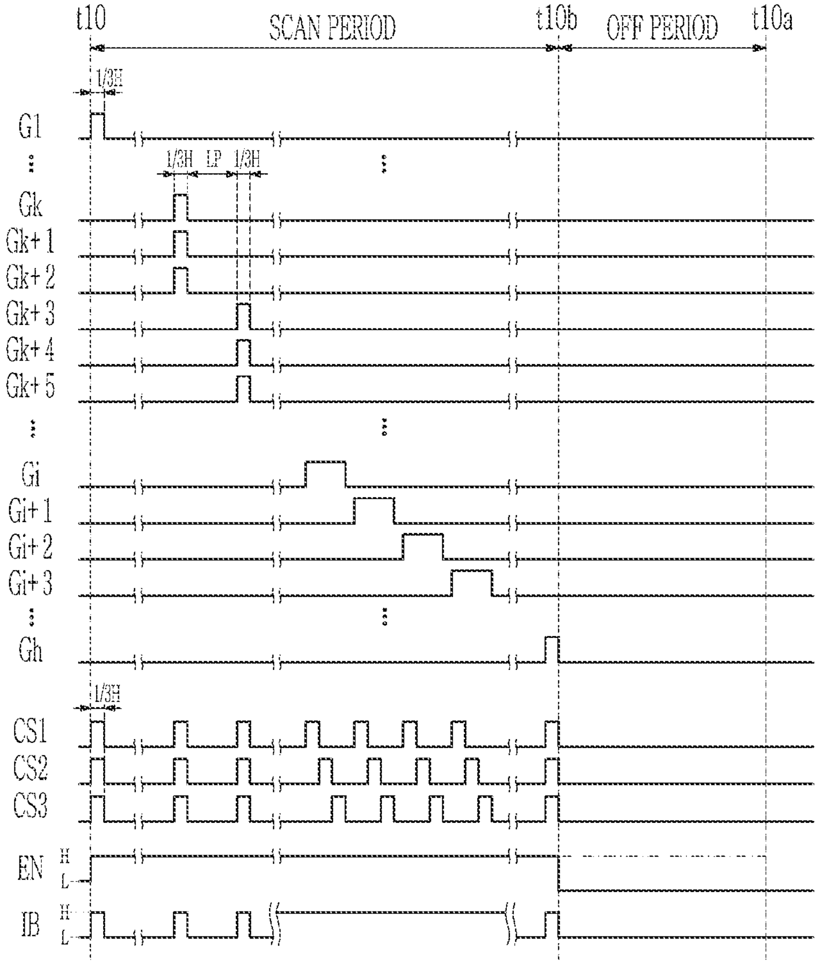
FIG. 13 is a timing diagram illustrating a scan period of a display device according to an example embodiment.

FIG. 13 is a timing diagram illustrating a scan period of a display device according to an example embodiment.

Referring to FIGS. 3 and 13 together, during the scan period (SCAN PERIOD) between t10 and t10*b*, the gate driver 320 may apply a plurality of gate signals G1, . . . , Gh to the plurality of gate lines GL1, . . . , GLh. The gate driver 320 may apply gate signals G1, . . . , Gk+5, and Gh overlapping each other with horizontal periods (⅓H) to the gate lines GL1, . . . , GLk+5, and GLh. For example, the gate driver 320 may apply gate signals (Gk to Gk+2, Gk+3 to Gk+5) that overlap each other by a horizontal period (⅓H) in units of three gate lines (GLk to GLk+2, GLk+3 to GLk+5). In some embodiments, the gate driver 320 may output the gate signals Gk, . . . , Gk+5 such that the horizontal blanking period LP between two groups of gate lines GLK, GLk+1, GLk+2 and GLk+3, GLk+4, GLk+5 driven sequentially is greater than the horizontal period ⅓H of each of the gate signals Gk, . . . , Gk+5.

For example, when the gate driver 320 applies gate signals with overlapping horizontal periods ⅓H to a plurality of gate lines GLk, GLk+1, GLk+2 of gate lines GL1, . . . , GLk+5, and GLh, and then applies gate signals with overlapping horizontal periods ⅓H to the plurality of gate lines GLk+3, GLk+4, GLk+5 of gate lines GL1, . . . , GLk+5, and GLh, the gate driver 320 may output the gate signals Gk, . . . , Gk+5 such that the horizontal blanking period LP from after applying the gate signals Gk, Gk+1, Gk+2 to before applying the gate signals Gk+3, Gk+4, Gk+5 is greater than the horizontal period ⅓H of each of the gate signals Gk, . . . , Gk+5. The gate driver 320 may apply gate signals Gi, . . . , Gi+3 that do not overlap each other in horizontal periods 1H to the gate lines GLi, . . . , GLi+3.

The enable signal EN may be provided at an enable level (H, high level) during the scan period (SCAN PERIOD). The bias current IB may be applied at a high level H in each of the horizontal periods ⅓H and 1H of the gate signals, and at a low level L during the horizontal blanking period LP between the horizontal periods ⅓H of the gate signals. The control signals CS1, CS2, and CS3 may have an enable level in each of the horizontal periods ⅓H of the gate signals G1, . . . , Gk+5, and Gh. In this case, periods in which the control signals CS1, CS2, and CS3 have enable levels may overlap each other. Each of the control signals CS1, CS2, and CS3 may have an enable level in each of the horizontal periods 1H of the gate signals Gi, . . . , Gi+3. In this case, periods in which each of the control signals CS1, CS2, and CS3 have enable levels that do not overlap each other.

In FIG. 13, it is shown that the horizontal periods of signals applied to three gate lines (GLk, GLk+1, and GLk+2) overlap. In this regard, during one horizontal period 1H, a gate signal may be applied to each of gate lines GLk to GLk+2, and during another horizontal period 1H, a gate signal may be applied to each of gate lines GLk+3 to GLk+5. However, embodiments are not limited thereto, and can also be applied to overlapping horizontal periods of the signals applied to a plurality of gate lines, such as two, four, five, etc.

According to an embodiment, because the source driver 330 is in the low bias state during the horizontal blanking periods LPs and in the off state during the off periods (OFF PERIOD), power consumption may be reduced compared to when the source driver 330 is in the normal bias state during the scan period (SCAN PERIOD) and when the source driver 330 is in the on state during the scan period (SCAN PERIOD) between t10 and t10*a* in the normal drive mode.

Figure 14:
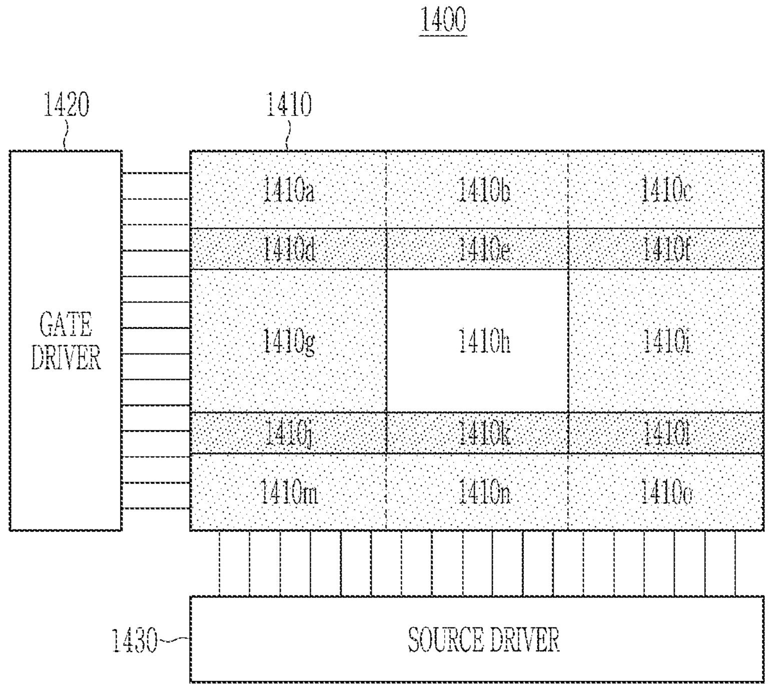
FIG. 14 illustrates a display panel displaying the image of FIG. 4 according to an example embodiment.

FIG. 14 illustrates a display panel displaying the image of FIG. 4 according to an example embodiment.

Referring to FIG. 14, the image 400 of FIG. 4 may be displayed on the pixel array 1410 of the display panel 1400. An area 1410*h* of the pixel array 1410 corresponding to the first area 410 of the image 400 and areas 1410*a* of the pixel array 1410 corresponding to the second area 420 of the image 1400; . . . , 1410*g*, and 1410*i*, . . . , 14100 may be driven in different ways. Further, among the areas 1410*a*, . . . , 1410*g*, and 1410*i*, . . . , 14100 of the pixel array 1410 corresponding to the second area 420, areas 1410*d*, . . . , 1410*f*, and 1410*j*, . . . , 1410*i* that are adjacent to the first area 1410*h* in the direction of the arrangement of the gate lines and areas 1410*a*, . . . , 1410*c*, and 1410*m*, . . . , 14100 that are spaced apart from the first area 1410*h* may be driven in different ways.

The gate driver 1420 may drive gate lines connected to areas 1410*d*, . . . , 1410*f*, and 1410*j*, . . . , 1410*i*, and gate lines connected to areas 1410*a*, . . . , 1410*c*, and 1410*m*, . . . , 14100 in different ways. In this case, gate lines connected to area 1410*e* may be connected to areas 1410*g* and 1410*i*.

The gate driver 1420 may provide the gate signals to the pixel array 1410 such that at least two horizontal periods of the gate signals provided to the gate lines connected to area 1410*e*, a horizontal period of the gate signals provided to the gate lines connected to the areas 1410*d*, . . . , 1410*f*, and 1410*j*, . . . , 1410*i*, and a horizontal period of gate signals provided to gate lines connected to the areas 1410*a*, . . . , 1410*c*, 1410*m*, . . . , 14100 differ from each other. The gate driver 1420 may provide gate signals to pixel array 1410 such that gate signals provided to gate lines connected to area 1410*h* do not overlap, and gate signals provided to gate lines connected to areas 1410*a*, . . . , 1410*f*, and 1410*j*, . . . , 1410*o* overlap each other. In some embodiments, the gate driver 1420 may provide gate signals to pixel array 1410 such that horizontal periods of gate signals provided to gate lines connected to areas 1410*d*, . . . , 1410*f*, and 1410*j*, . . . , 1410*i* overlap each other by two gate line units, and horizontal periods of gate signals provided to gate lines connected to areas 1410*a*, . . . , 1410*c*, and 1410*m*, . . . , 14100 overlap each other by three gate line units. In some embodiments, horizontal periods of the gate signals applied to adjacent gate lines among the gate lines connected to areas 1410*a*, . . . , 1410*f*, and 1410*j*, . . . , 14100 may overlap. When the gate driver 1420 applies gate signals to a plurality of gate lines (e.g., a first gate line group), of the gate lines connected to the areas 1410*a*, . . . , 1410*f*, and 1410*j*, . . . , 14100, that overlap each other, and then applies gate signals to a plurality of gate lines (e.g., a second gate line group), of the gate lines connected to the areas 1410*a*, . . . , 1410*f*, and 1410*j*, . . . , 14100, that overlap each other, the gate driver 1420 may provide the gate signals to the pixel array 1410 such that a period from after applying the gate signals to the first gate line group to before applying the gate signals to the second gate line group is longer than a horizontal period of the gate signals.

The source driver 1430 may drive at least two of (i) source lines while gate signals are applied to the areas 1410*a*, . . . , 1410*c*, and 1410*m*, . . . , 14100, (ii) source lines while gate signals are applied to the areas 1410*d*, . . . , 1410*f*, and 1410*j*, . . . , 14101, and (iii) source lines while gate signals are applied to the areas 1410*g*, . . . , 1410*i*, in different ways. The source driver 1430 may apply the same data signal to pixels connected to the same source line while gate signals are applied to 1410*a*, . . . , 1410*c*, and 1410*m*, . . . , 14100, and may apply different data signals to pixels connected to the same source line while gate signals are applied to areas 1410*d*, . . . 1410*f*, and 1410*j* . . . , 1410*l*. The source driver 1430 may apply the same data signal to a plurality of pixels connected to a plurality of source lines adjacent to each other among the source lines connected to the areas 1410*a*, . . . , 1410*c*, and 1410*m*, . . . , 14100, while the gate signals are applied to the areas 1410*a*, . . . , 1410*c*, and 1410*m*, . . . , 1410*o*.

The source driver 1430 may be driven in a low bias state or turned off during a period corresponding to the number of gate lines provided with gate signals whose horizontal periods overlap during a scan period within one frame period according to the frame frequency.

Figure 15:
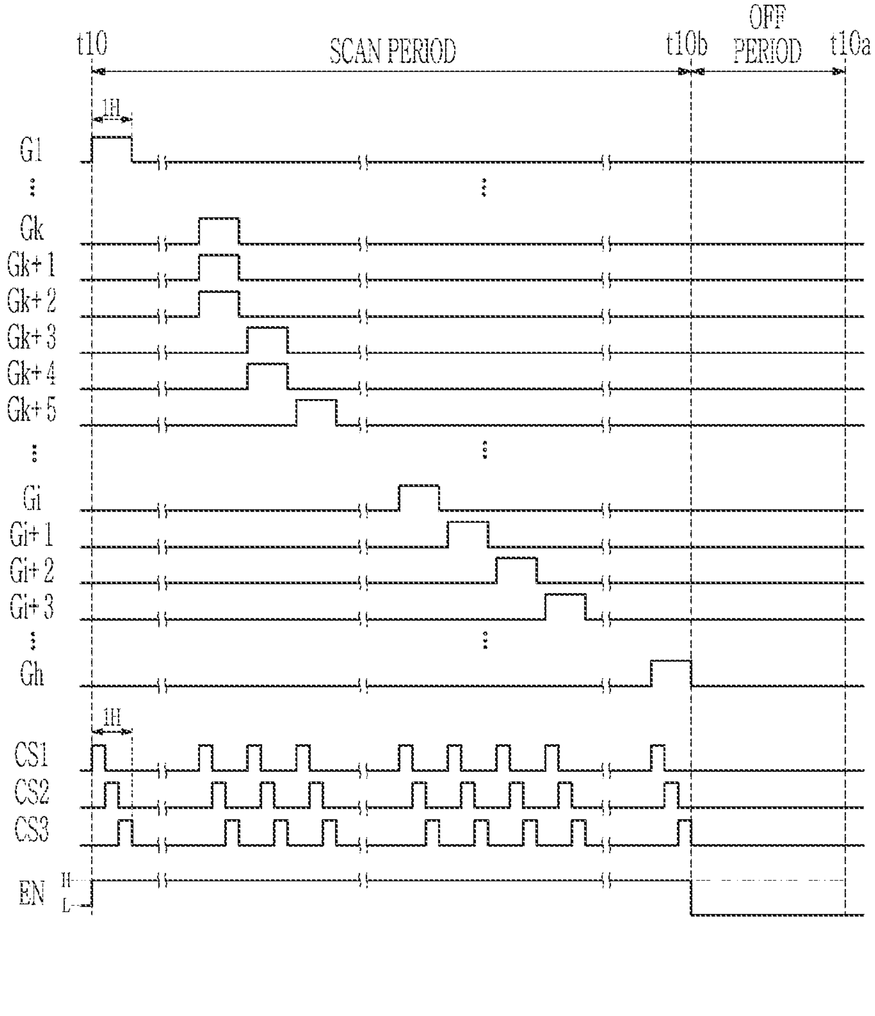
FIG. 15 is a timing diagram illustrating a scan period of a display device according to an example embodiment.

FIG. 15 is a timing diagram illustrating a scan period of a display device according to an example embodiment.

Referring to FIGS. 3 and 15 together, during the scan period (SCAN PERIOD) between t10 and t10*b*, the gate driver 320 may apply a plurality of gate signals G1, . . . , Gh to the plurality of gate lines GL1, . . . , GLh. The gate lines GL1, . . . , GLk+5, GLh may be connected to pixels PXs displaying a second area of the image in the pixel array 310, and the gate lines GLi, . . . , GLi+3 may be connected to pixels PXs displaying a first area of the image in the pixel array 310. The gate driver 320 may apply gate signals G1, . . . , Gk+5, and Gh overlapping each other with horizontal periods 1H to the gate lines GL1, . . . , GLk+5, and GLh.

The gate driver 320 may apply gate signals in different ways to gate lines GLk+3, . . . , GLk+5 adjacent to gate lines GLi, . . . , GLi+3 connected to pixels PXs displaying the first area of the image and to gate lines GL1, . . . , GLk+2, Gh spaced apart from gate lines GLi, . . . , GLi+3 connected to pixels PXs displaying the first area of the image. For example, the gate driver 320 may apply gate signals Gk+3, . . . , Gk+5 to the gate lines GLk+3, . . . , GLk+5 such that the horizontal periods of the gate signals provided to the N gate lines overlap each other, and apply gate signals G1, . . . , Gk+3, Gh to the gate lines GL1, . . . , GLk+2, Gh such that the horizontal periods of the gate signals provided to the M gate lines overlap each other ($N<M$, where N and M are the positive integers greater than or equal to 2). For example, the gate driver 320 may apply gate signals Gk+3 and Gk+4 that overlap each other by a horizontal period 1H in two gate line units GLk+3 and GLk+4, and apply gate signals Gk, . . . , Gk+2 that overlap each other by a horizontal period 1H in three gate line units GLk, . . . , GLk+2. The gate driver 320 may apply gate signals Gi, . . . , Gi+3 to the gate lines GLi, . . . , GLi+3 that do not overlap each other by a horizontal period 1H.

The enable signal EN may be provided as an enable level (H, high level) during the scan period (SCAN PERIOD) and as a disable level (L, low level) during the off period (OFF PERIOD) between time t10*b* and time t10*a*. Each of the control signals CS1, CS2, and CS3 may have an enable level in each of the horizontal periods 1H of the gate signals. Periods in which each of the control signals CS1, CS2, and CS3 have enable levels that do not overlap each other.

According to an embodiment, because the source driver 330 is in an off state during the off period (OFF PERIOD), power consumption may be reduced compared to if the source driver 330 is in an on state during the scan period (SCAN PERIOD) between t00 and t00a in normal operation mode.

Figure 16:
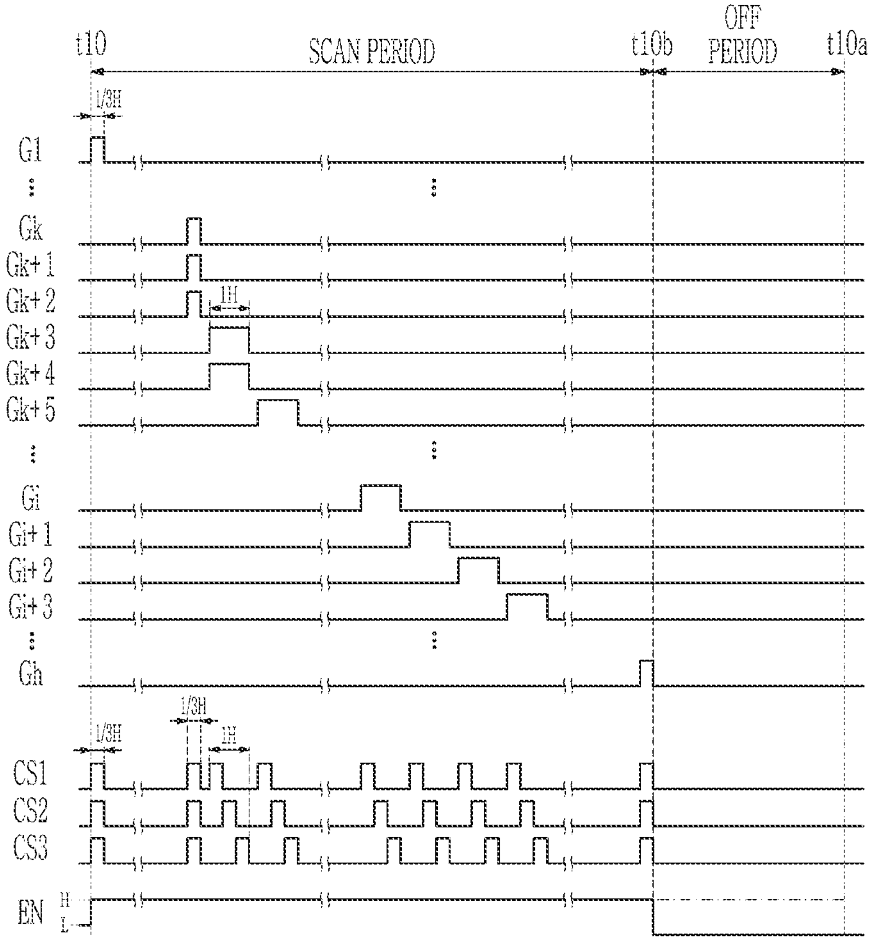
FIG. 16 is a timing diagram illustrating a scan period of a display device according to an example embodiment.

FIG. 16 is a timing diagram illustrating a scan period of a display device according to an example embodiment.

Referring to FIGS. 3 and 16 together, during the scan period (SCAN PERIOD) between time t10 and time t10b, the gate driver 320 may apply a plurality of gate signals G1, . . . , Gh to the plurality of gate lines GL1, . . . , GLh. The gate lines GL1, . . . , GLk+5, GLh may be connected to pixels PXs displaying a second area of the image in the pixel array 310, and the gate lines GLi, . . . , GLi+3 may be connected to pixels PXs displaying a first area of the image in the pixel array 310. The gate driver 320 may apply gate signals G1, . . . , Gk+5, and Gh overlapping each other with horizontal periods ⅓H or 1H to the gate lines GL1, . . . , GLk+5, and GLh. The gate driver 320 may apply gate signals in different ways to gate lines GLk+3, . . . , GLk+5 adjacent to gate lines GLi, . . . , GLi+3 connected to pixels PXs displaying the first area of the image and to gate lines GL1, . . . , GLk+2, Gh spaced apart from gate lines GLi, . . . , GLi+3 connected to pixels PXs displaying the first area of the image. For example, the gate driver 320 may apply gate signals Gk+3, . . . , Gk+5 to the gate lines GLk+3, . . . , GLk+5 such that the horizontal periods of the gate signals provided to the N gate lines overlap each other, and apply gate signals G1, . . . , Gk+3, Gh to the gate lines GL1, . . . , GLk+2, Gh such that the horizontal periods of the gate signals provided to the M gate lines overlap each other (N<M, where N and M are the positive integers greater than or equal to 2). For example, the gate driver 320 may apply gate signals Gk+3 and Gk+4 that overlap each other by a horizontal period 1H in two gate line units GLk+3 and GLk+4, and apply gate signals Gk, . . . , Gk+2 that overlap each other by a horizontal period 1H in three gate line units GLk, . . . , GLk+2. The gate driver 320 may apply gate signals Gi, . . . , Gi+3 to the gate lines GLi, . . . , GLi+3 that do not overlap each other by a horizontal period 1H. The gate driver 320 may apply a plurality of gate signals G1, . . . , Gh such that the length of the horizontal period ⅓H of the gate signals G1, . . . , Gk+2, Gh provided to the gate lines GL1, . . . , GLk+2, GLh differs from the length of the horizontal period 1H of the gate signals Gk+3, . . . , Gi+3 provided to the gate lines GLk+3, . . . , GLi+3. That is, the horizontal period of the gate signals Gk+3, . . . . Gk+5 provided by the gate lines GLk+3, . . . . GLk+5 adjacent to the pixels PXs displaying the first area of the image is longer than the horizontal period of the gate signals Gk, . . . . Gk+2 provided by the gate lines GLK, . . . . GLk+2 spaced apart from the pixels PXs displaying the first area of the image.

The enable signal EN may be provided as an enable level (H, high level) during the scan period (SCAN PERIOD) and as a disable level (L, low level) during the off period (OFF PERIOD) between time t10b and time t10a. The control signals CS1, CS2, and CS3 may have an enable level in each of the horizontal periods ⅓H of the gate signals G1, . . . , Gk+2, and Gh. In this case, periods in which the control signals CS1, CS2, and CS3 have enable levels may overlap each other. Each of the control signals CS1, CS2, and CS3 may have an enable level in each of the horizontal periods 1H of the gate signals Gk+3, . . . , Gi+3. In this case, periods in which each of the control signals CS1, CS2, and CS3 have enable levels that do not overlap each other.

According to an example embodiment, because the source driver 330 is in an off state during the off period (OFF PERIOD), normal operation mode, power consumption may be reduced compared to when the source driver 330 is in the on state during the scan period (SCAN PERIOD) between t10 and t10a.

Figure 17:
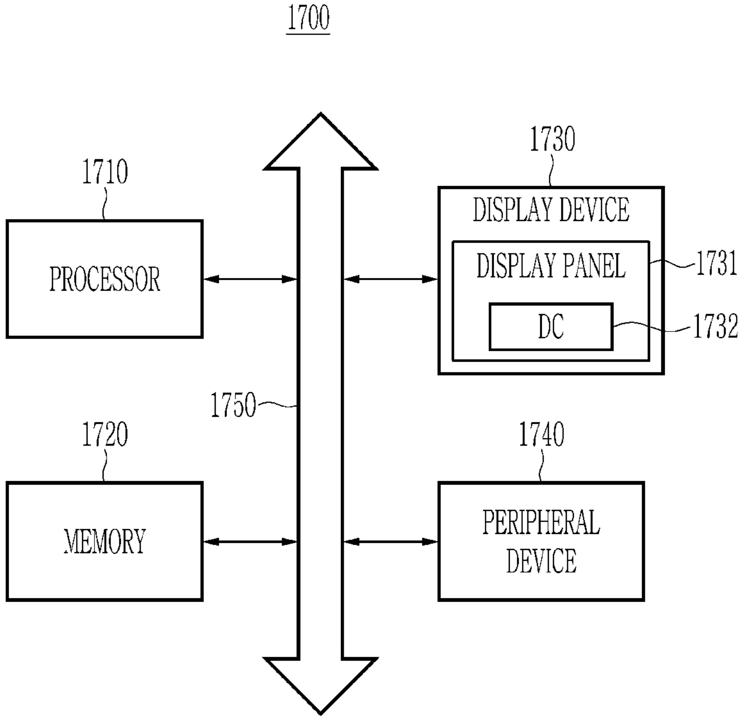
FIG. 17 is a diagram for explaining a display system according to an example embodiment.

FIG. 17 is a diagram for explaining a display system according to an example embodiment.

Referring to FIG. 17, a display system 1700 according to an example embodiment may include a processor 1710, a memory 1720, a display device 1730, and a peripheral device 1740 electrically connected to a system bus 1750

The processor 1710 may control the input and output of data from the memory 1720, the display device 1730, and the peripheral device 1740, and may perform image processing of image data transmitted between the corresponding devices.

The memory 1720 may include volatile memory such as dynamic random access memory (DRAM) and/or non-volatile memory such as flash memory. The memory 1720 includes DRAM, phase-change random access memory (PRAM), magnetic random access memory (MRAM), resistive random access memory (ReRAM), ferroelectric random access memory (FRAM), NOR flash memory, NAND flash memory, and a fusion flash memory (for example, a memory in which a static random access memory (SRAM) buffer, a NAND flash memory, and a NOR interface logic are combined) or the like. The memory 1720 may store image data obtained from the peripheral device 1740 or image signals processed by the processor 1710.

The display device 1730 may include a display panel 1731 and control image data transmitted through the system bus 1750 to be displayed on the display panel 1731. The display panel 1731 may be a display panel according to an example embodiment. The display panel 1731 may include a driving circuit 1732. The driving circuit 1732 may provide signals to a first area rendered with a first quality and a second area rendered with a second quality, in different ways. For example, the driving circuit 1732 may provide gate signals to gate lines in the first area according to a first driving method and provide gate signals to gate lines in the second area according to a second driving method. Compared to providing gate signals to the gate lines in the second area according to the first operation method, the period of providing gate signals to the gate lines in the second area according to the second operation method may be shortened. The driving circuit 1732 may be driven in a low bias state or turned off during a partial period corresponding to a shortened period of scan periods within one frame period.

The peripheral device 1740 may be a device that converts a video or still image into an electrical signal, such as a camera, scanner, or webcam. Image data obtained by the peripheral device 1740 may be stored in the memory 1720 or displayed on the display panel 1731 in real time.

The display system 1700 may be provided in mobile electronic products such as smart phones, but is not limited thereto, and may be provided in various types of electronic products that display images.

In some embodiments, each component or combination of two or more components described with reference to FIGS. 1 to 17 may be implemented as a digital circuit, a programmable or non-programmable logic device or array, an application specific integrated circuit (ASIC), or the like.

While aspects of example embodiments have been particularly shown and described, it will be understood that various changes in form and details may be made therein without departing from the spirit and scope of the following claims.

What is claimed is:

1. A display device, comprising:

a pixel array comprising a plurality of pixels connected to a plurality of gate lines and a plurality of source lines; and a driving circuit configured to:

apply a plurality of gate signals to the plurality of gate lines and provide a plurality of data signals to the plurality of source lines during a first scan period, and apply the plurality of gate signals to first gate lines, of the plurality of gate lines, connected to pixels in a first area of the pixel array in a different manner from second gate lines, of the plurality of gate lines, connected to pixels in a second area of the pixel array and provide the plurality of data signals to the plurality of source lines for a portion of a second scan period, and maintain a low-biased state or an off state for a remaining portion of the second scan period, wherein the second scan period is shorter than the first scan period.

2. The display device of claim 1, wherein a horizontal blanking period between two sequentially driven gate line groups of a plurality of gate line groups in which the second gate lines are grouped into two or more gate line units is longer than a horizontal period of each of the plurality of gate signals applied to the plurality of gate lines within the two sequentially driven gate line groups, and wherein the driving circuit is configured to be in the low-biased state during the horizontal blanking period.

3. The display device of claim 1, wherein horizontal periods of the plurality of gate signals applied to the first gate lines do not overlap with each other, and horizontal periods of some of the plurality of gate signals applied to the second gate lines overlap with each other.

4. The display device of claim 1, wherein the driving circuit is further configured to apply the plurality of gate signals to the second gate lines connected to pixels adjacent to the first area among pixels in the second area such that horizontal periods of n gate signals of the second gate lines corresponding to n gate lines overlap with each other, and apply the plurality of gate signals to the second gate lines connected to pixels spaced apart from the first area among the pixels in the second area such that horizontal periods of m gate signals corresponding to m gate lines of the second gate lines overlap with each other, where n and m are positive integers, and $m>n$.

5. The display device of claim 1, wherein horizontal periods of the plurality of gate signals applied to the first gate lines are longer than horizontal periods of the plurality of gate signals applied to the second gate lines.

6. The display device of claim 1, wherein a horizontal period of each of the plurality of gate signals applied to the second gate lines adjacent to the first area is longer than a horizontal period of each of the plurality of gate signals applied to the second gate lines connected to pixels spaced apart from the first area.

7. The display device of claim 1, wherein the driving circuit comprises:

a gate driver configured to apply the plurality of gate signals to the plurality of gate lines; and a source driver configured to apply the plurality of data signals to the plurality of source lines during the portion of the second scan period and maintain the low-biased state or the off state during the remaining portion of the second scan period.

8. The display device of claim 7, wherein the source driver comprises:

a plurality of switches connected to the plurality of source lines and configured to select at least one of the plurality of source lines; and a plurality of amplifiers configured to receive an enable signal and output the plurality of data signals to the plurality of switches based on the enable signal being at an enable level.

9. The display device of claim 8, wherein the enable signal is applied at the enable level during the portion of the second scan period and at a disable level during the remaining portion of the second scan period.

10. The display device of claim 8, wherein each of the plurality of amplifiers is configured to receive a bias current, wherein the enable signal is applied at the enable level during the second scan period, and wherein the bias current is applied at a high level during part of the second scan period and at a low level during the remaining portion of the second scan period.

11. The display device of claim 8, wherein each of the plurality of switches is configured to simultaneously apply a data signal transmitted from the plurality of amplifiers to the plurality of source lines.

12. The display device of claim 1, wherein a time length of the remaining portion of the second scan period corresponds to a method of applying the plurality of gate signals to the plurality of gate lines connected to pixels in the second area.

13. The display device of claim 1, wherein the pixel array and the driving circuit are on a common silicon substrate.

14. A display system, comprising:

a host device configured to provide image data indicating an image comprising a first area rendered with a first quality and a second area rendered with a second quality lower than the first quality; and a display device comprising:

a pixel array comprising a plurality of pixels and configured to receive a plurality of data signals corresponding to the image data during a scan period, and emit light corresponding to the plurality of data signals during an emission period following the scan period; and a driving circuit configured to receive the image data and maintain a low-biased state or an off state for a portion of the scan period, wherein the portion of the scan period is determined based on a time of providing the plurality of data signals to pixels corresponding to the second area of the plurality of pixels.

15. The display system of claim 14, wherein the display device further comprises an eye tracking sensor configured to track an eye position and output eye tracking data to the host device, and wherein the host device is configured to render an area corresponding to the eye position with the first quality, and render an area around the area with the second quality.

16. The display system of claim 14, wherein the driving circuit is further configured to drive pixels corresponding to the first area in a different manner than pixels corresponding to the second area.

17. The display system of claim 14, wherein the host device is further configured to provide area indication data indicating locations of the first area and the second area to the display device, and wherein the display device is configured to identify the first area and the second area based on the area indication data.

18. The display system of claim 14, wherein the display device further comprises an optical system configured to correct image light emitted from the pixel array.

19. A method of driving a display device, comprising:

applying non-overlapping gate signals to first gate lines connected to first pixels in a first area during a first portion of a scan period;

applying data signals corresponding to the first pixels to source lines connected to the first pixels;

applying overlapping gate signals to second gate lines connected to second pixels in a second area different from the first area during a second portion of the scan period;

applying data signals corresponding to the second pixels to source lines connected to the second pixels; and controlling a driving circuit of the display device to enter a low-biased state or an off state during the second portion of the scan period.

20. The method of claim 19, wherein a horizontal period of each of the non-overlapping gate signals applied to the first gate lines is longer than a horizontal period of each of the overlapping gate signals applied to the second gate lines.

* * * * *